(12) United States Patent
Perron et al.

(10) Patent No.: US 9,434,321 B2
(45) Date of Patent: Sep. 6, 2016

(54) VEHICLE STORAGE ASSEMBLY

(71) Applicant: Oshkosh Corporation, Oshkosh, WI (US)

(72) Inventors: Jacob Perron, Chambersburg, PA (US); Bradley Kresge, Hagerstown, MD (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 14/563,728

(22) Filed: Dec. 8, 2014

(65) Prior Publication Data

US 2016/0009231 A1    Jan. 14, 2016

Related U.S. Application Data

(60) Provisional application No. 62/022,563, filed on Jul. 9, 2014.

(51) Int. Cl.
    *B60R 11/06*      (2006.01)
    *A47B 49/00*      (2006.01)
    *B60R 11/00*      (2006.01)

(52) U.S. Cl.
    CPC ............. *B60R 11/06* (2013.01); *A47B 49/004* (2013.01); *B60R 2011/0085* (2013.01)

(58) Field of Classification Search
    CPC ......... B60R 5/006; B60R 11/06; B60R 9/00; B60R 2011/0085; Y10T 24/3902; B25H 3/022; B25H 3/025; B25H 3/04; A47B 49/00; A47B 49/004; A47F 5/02; A47F 7/0028; A47F 3/10
See application file for complete search history.

(56) References Cited

U.S. PATENT DOCUMENTS

| 2,526,245 | A | * | 10/1950 | Lathrop | A47B 49/00 108/139 |
| 3,150,778 | A | * | 9/1964 | Gurian | A47F 5/02 211/181.1 |
| 3,315,815 | A | * | 4/1967 | Wittek | A47B 81/005 211/70.2 |
| 3,574,435 | A | * | 4/1971 | Barroero | A47F 5/02 312/305 |
| 3,685,661 | A | * | 8/1972 | Kimmel | A47B 81/005 211/144 |
| 3,807,788 | A | * | 4/1974 | Radek | A47F 5/02 211/131.1 |

(Continued)

OTHER PUBLICATIONS

U.S. Appl. No. 14/140,231, filed Dec. 24, 2013, Gillmore et al.

(Continued)

*Primary Examiner* — Paul N Dickson
*Assistant Examiner* — Timothy Wilhelm
(74) *Attorney, Agent, or Firm* — Foley & Lardner LLP

(57) ABSTRACT

A vehicle storage assembly includes a bracket, a mounting plate, a post having a distal end and a proximal end, an upper member defining a frame configured to support a rigging accessory, a lower member, and a locking member positioned to selectively fix the orientation of the post, the upper member, and the lower member. The distal end of the post is rotatably coupled to the bracket and the proximal end of the post is rotatably coupled to the mounting plate. The upper member includes an outer wall and a plurality of supports defining a plurality of stations, the plurality of supports coupling the outer wall to the post. The lower member includes an outer panel and a plurality of partitions defining a plurality of cavities configured to receive the rigging accessory, the plurality of partitions coupling the outer panel to the post.

11 Claims, 26 Drawing Sheets

(56) References Cited

U.S. PATENT DOCUMENTS

| | | | |
|---|---|---|---|
| 3,938,665 A * | 2/1976 | Rumble | A47F 3/10 |
| | | | 211/163 |
| 3,981,405 A * | 9/1976 | Slack | A47F 7/175 |
| | | | 211/163 |
| 4,056,194 A * | 11/1977 | Radek | A47F 5/02 |
| | | | 211/131.1 |
| 5,397,005 A * | 3/1995 | Taccolini | A47F 7/0021 |
| | | | 211/163 |
| 5,738,229 A * | 4/1998 | Fairweather | A63B 55/10 |
| | | | 211/70.2 |
| 5,951,235 A | 9/1999 | Young et al. | |
| 6,315,515 B1 | 11/2001 | Young et al. | |
| 6,336,783 B1 | 1/2002 | Young et al. | |
| 6,447,239 B2 | 9/2002 | Young et al. | |
| 6,565,305 B2 | 5/2003 | Schrafel | |
| 7,070,382 B2 | 7/2006 | Pruteanu et al. | |
| 7,284,943 B2 | 10/2007 | Pruteanu et al. | |
| 7,489,098 B2 | 2/2009 | Harris et al. | |
| 7,559,735 B2 | 7/2009 | Pruteanu et al. | |
| 7,671,547 B2 | 3/2010 | Addleman | |
| 7,878,750 B2 | 2/2011 | Zhou et al. | |
| 7,909,561 B2 | 3/2011 | Addleman et al. | |
| 8,182,194 B2 | 5/2012 | Pruteanu et al. | |
| 8,360,706 B2 | 1/2013 | Addleman et al. | |
| 8,540,475 B2 | 9/2013 | Kuriakose et al. | |
| 8,807,613 B2 | 8/2014 | Howell et al. | |
| 2004/0195133 A1* | 10/2004 | Duncan | A47F 5/02 |
| | | | 206/443 |
| 2011/0170997 A1 | 7/2011 | Addleman et al. | |
| 2012/0282077 A1 | 11/2012 | Alberts et al. | |
| 2013/0251485 A1 | 9/2013 | Howell et al. | |
| 2014/0238704 A1 | 8/2014 | Moore et al. | |
| 2014/0251726 A1 | 9/2014 | Ditty et al. | |
| 2014/0271076 A1 | 9/2014 | Perron | |
| 2015/0016931 A1 | 1/2015 | Kuriakose et al. | |
| 2015/0033962 A1 | 2/2015 | Schwartz et al. | |

OTHER PUBLICATIONS

U.S. Appl. No. 14/209,483, filed Mar. 13, 2014, Yanming.

Images of Jerr-Dan 50/60 Ton Rotator 2013 Prototype display at Baltimore Tow Show 2013, Nov. 15, 2013, 26 pages.

Towing & Recovery Industry News feature on Jerr-Dan Incident Management Body 50/60 Ton Rotator, Tow Professional, vol. 2, Issue 9, published Dec. 2013, 1 page.

Jerr-Dan's Incident Management Body, Towman Magazine, p. 11, Jan. 2014, 1 page.

Jerr-Dan 50/60 Ton Rotator with JFB Product Images from Daytona Fire Show, Jan. 24, 2014, 18 pages.

Jerr-Dan, Chain Carousel Product Images, product disclosed as of Apr. 2014, 63 pages.

Jerr-Dan, 50/60 Ton Heavy Duty Rotator with JFB Product Line Brochure, available as of Jun. 17, 2014, 2 pages.

Towing & Recovery Industry News feature on Jerr-Dan JFB Rotator Body product line, Tow Professional, vol. 3, Issue 6, published Aug. 2014, 1 page.

Jerr-Dan, 50/60 Ton Rotator JFB Body Series Details, available as of Aug. 7, 2014, 2 pages.

Miller Industries, Chain Rack Carousel, product shown as of Apr. 2014; product announcement available as of May 5, 2014, retrieved from the internet at: http://millerind.com/galleries/index.php-?pageId=2&page=popup&pid=4006&cat_id=67 on Mar. 9, 2015, 9 pages.

* cited by examiner

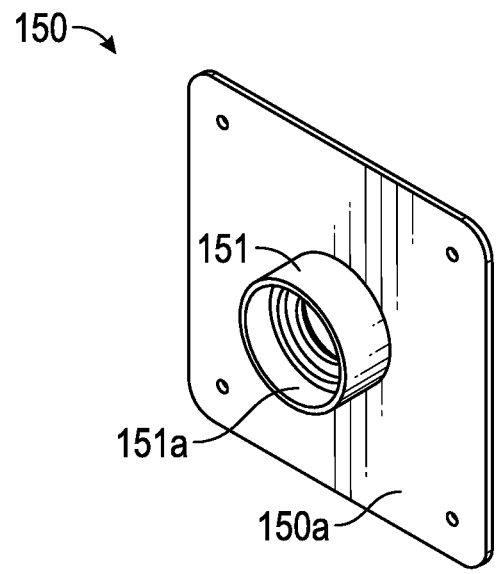
FIG. 10A
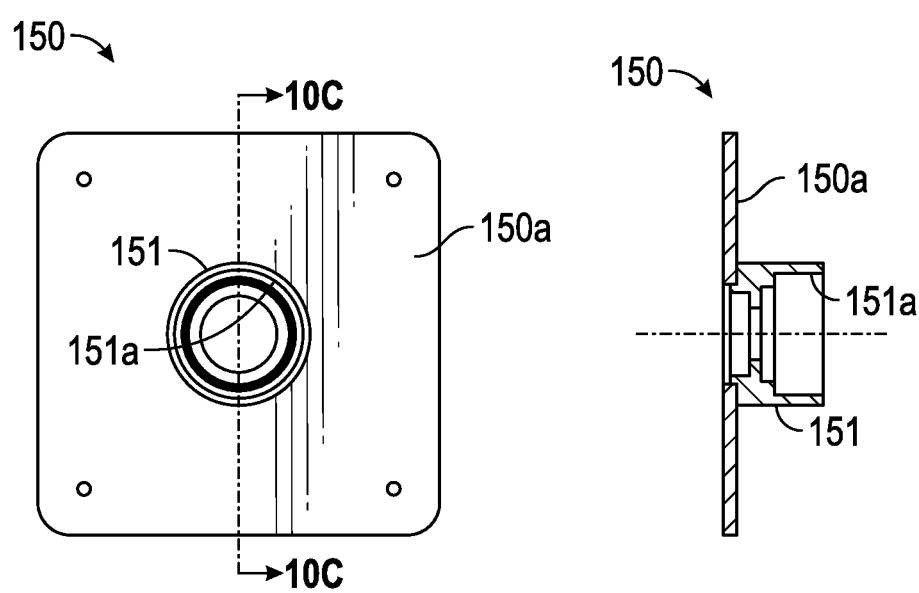
FIG. 10B
FIG. 10C

VEHICLE STORAGE ASSEMBLY

CROSS-REFERENCE TO RELATED PATENT APPLICATIONS

This application claims the benefit of U.S. Provisional Patent Application No. 62/022,563, filed Jul. 9, 2014, which is incorporated herein by reference in its entirety.

BACKGROUND

Traditional storage assemblies for wrecker vehicles include stationary bars, stationary shelves, or sliding racks. Such stationary bars, stationary shelves, or sliding racks may be located on the vehicle and may be accessible from an area surrounding the vehicle. By way of example, the storage assembly may include a cabinet having stationary bars to accommodate the storage of chains. By way of another example, the storage assembly may include a stationary shelf or a sliding rack to accommodate the storage of clevises or other equipment.

Traditional storage assemblies lack accessibility thereby making it difficult for the operator to retrieve or find various equipment due at least in part to the construction and design of the storage assembly. By way of example, some traditional storage assemblies have a fixed position within the vehicle (e.g., cabinets having stationary bars or stationary shelves, etc.). Although some storage assemblies are configured to slide, thereby improving access, these systems occupy a large space claim in a storage position and occupy a large footprint when moved into an access position. Traditional storage assemblies also lack accessibility due to a lack of organizational features, which can result in disorganized equipment (e.g., chains that are tangled or piled, etc.). Despite these accessibility issues, storage assemblies for wrecker vehicles traditionally include stationary bars, stationary shelves, or sliding racks.

SUMMARY

One exemplary embodiment relates to a vehicle storage assembly that includes a bracket, a mounting plate, a post having a distal end and a proximal end, an upper member defining a frame configured to support a rigging accessory, a lower member, and a locking member positioned to selectively fix the orientation of the post, the upper member, and the lower member thereby facilitating operator access to a desired one of the plurality of stations. The distal end of the post is rotatably coupled to the bracket and the proximal end of the post is rotatably coupled to the mounting plate. The upper member includes an outer wall and a plurality of supports defining a plurality of stations, the plurality of supports coupling the outer wall to the post. The lower member includes an outer panel and a plurality of partitions defining a plurality of cavities configured to receive the rigging accessory, the plurality of partitions coupling the outer panel to the post.

Another exemplary embodiment relates to a vehicle storage assembly that includes a bracket having a side wall that defines a cutout, a mounting plate, a shaft rotatably coupled to the bracket and the mounting plate, a hoop coupled to a distal end of the shaft and having a plurality of stations configured to support a rigging accessory, a bin coupled to a proximal end of the shaft and having a plurality of cavities configured to receive the rigging accessory, and a locking member positioned to selectively fix the orientation of the shaft, the hoop, and the bin thereby facilitating operator access to a desired one of the plurality of stations.

Another exemplary embodiment relates to a wrecker vehicle that includes a chassis, an engine coupled to the chassis, and a body coupled to the chassis, the body including a storage assembly. The storage assembly includes a bracket, a mounting plate, a post having a distal end and a proximal end, an upper member having a plurality of stations and configured to support a rigging accessory, a lower member having a plurality of cavities configured to receive the rigging accessory, and a locking member positioned to selectively fix the orientation of the post, the upper member, and the lower member. The distal end of the post is rotatably coupled to the bracket and the proximal end of the post is rotatably coupled to the mounting plate, the upper member is coupled to the distal end of the post, and the lower member is coupled to the proximal end of the post.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIGS. 10A-10C are views of a lower support member of a vehicle storage assembly, according to an exemplary embodiment;

DETAILED DESCRIPTION

Figure 1:
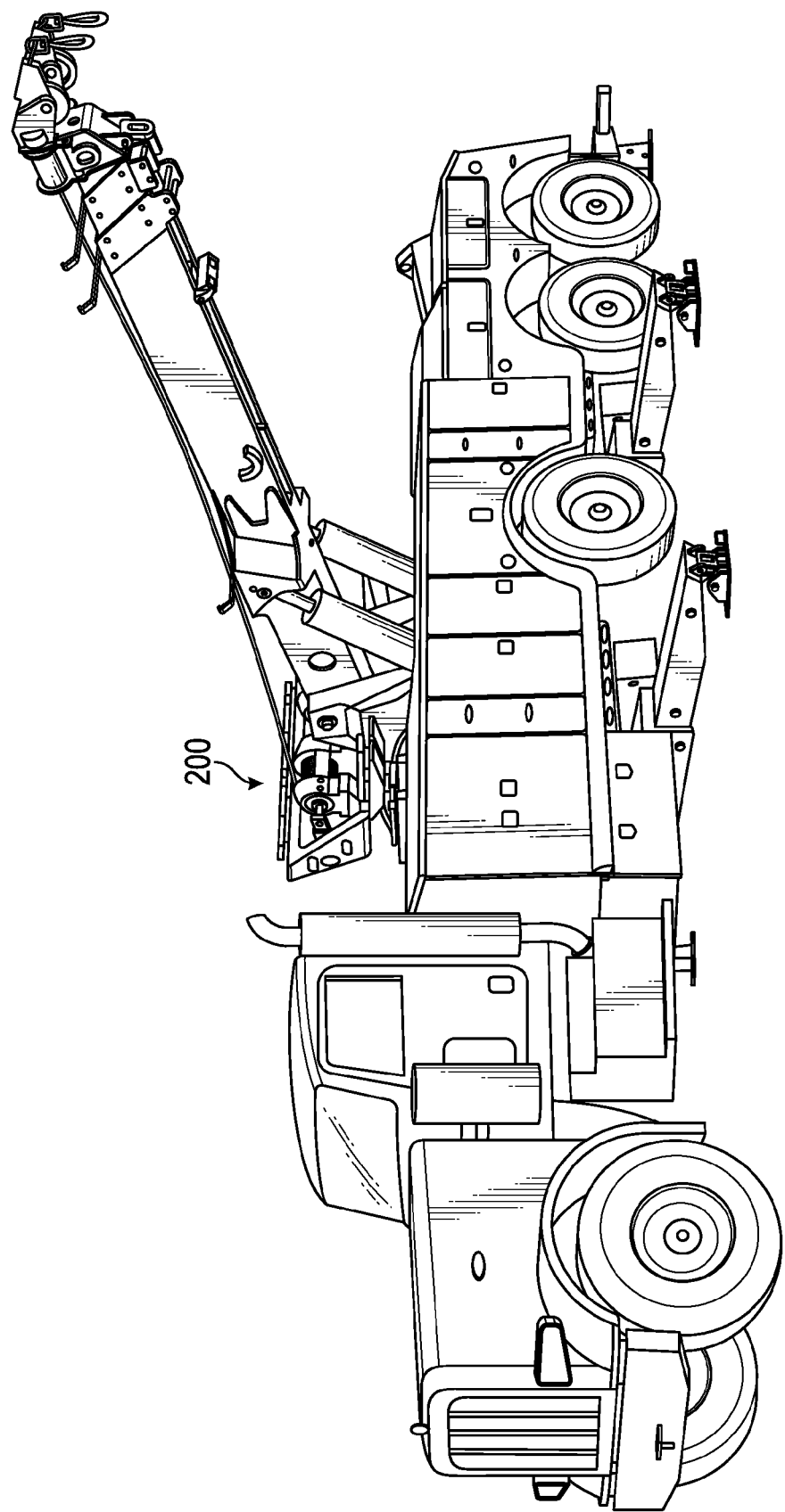
FIG. 1 is a perspective view of a wrecker vehicle, according to an exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

According to an exemplary embodiment, a storage assembly for a vehicle (e.g., a wrecker truck, a tow truck, a carrier truck, a fire truck, etc.) is selectively rotatable and configured to organize various equipment (e.g., chains, shackles, hooks, frame forks, hoses, etc.). The storage assembly is configured to be at least one of manually and automatically rotated into various positions. In one embodiment, the storage assembly is selectively lockable into a plurality of positions such that an operator may access various equipment stored thereon (e.g., chains, hooks, etc.). According to various exemplary embodiments, the storage assembly is configured to be coupled to a portion of a vehicle. The vehicle includes a chassis to which a body is coupled. By way of example, the storage assembly may be coupled to at least one of an interior wall, an exterior wall, a floor, and a ceiling of a storage compartment located on or within the body of the vehicle.

According to the exemplary embodiment, the vehicle includes an engine that is coupled to the chassis. The engine may receive fuel (e.g., gasoline, diesel, etc.) from a fuel tank and combust the fuel to generate mechanical energy. A transmission receives the mechanical energy and provides an output to a drive shaft. The rotating drive shaft is received by a differential, which conveys the rotational energy of the drive shaft to a final drive (e.g., wheels, etc.). The final drive then propels or moves the vehicle. According to an exemplary embodiment, the engine is a compression-ignition internal combustion engine that utilizes diesel fuel. In alternative embodiments, the engine is another type of device (e.g., spark-ignition engine, fuel cell, electric motor, etc.) that is otherwise powered (e.g., with gasoline, compressed natural gas, hydrogen, electricity, etc.).

Figure 2:
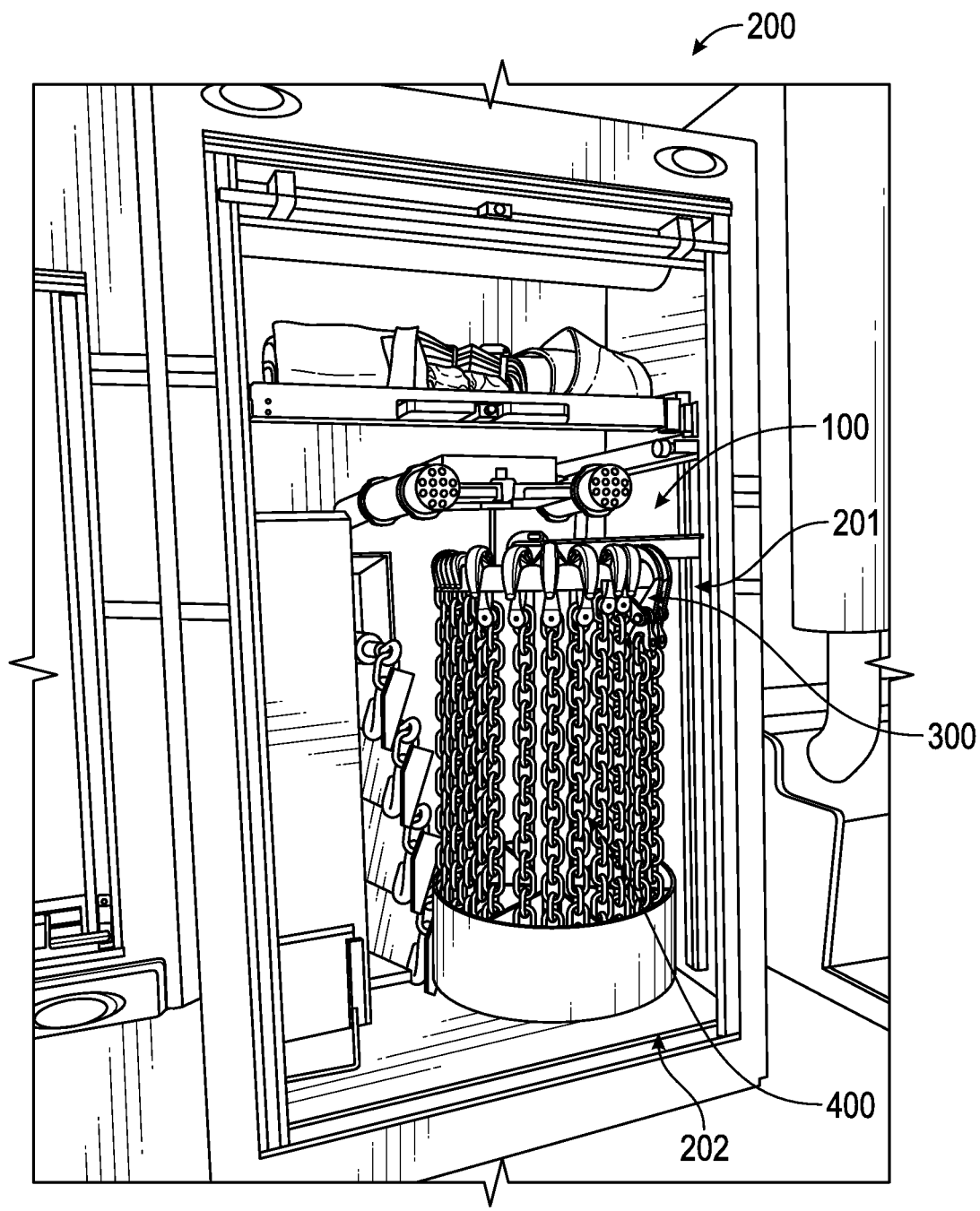
FIG. 2 is a side perspective view of a plurality of chains organized within a storage assembly that is installed on a vehicle, according to an exemplary embodiment.
Figure 3A:
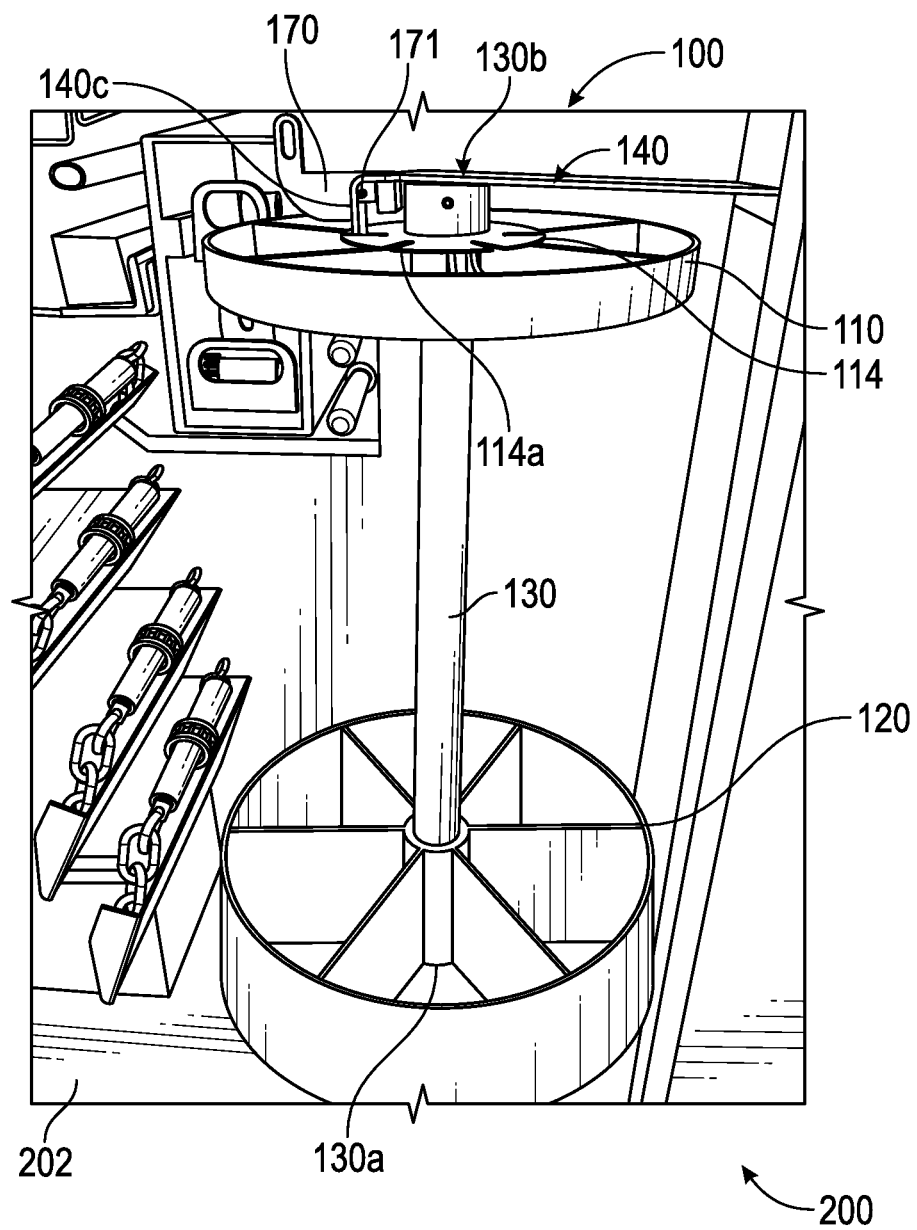
FIGS. 3A-3G are side perspective views of a vehicle storage assembly, according to an exemplary embodiment.
Figure 3B:
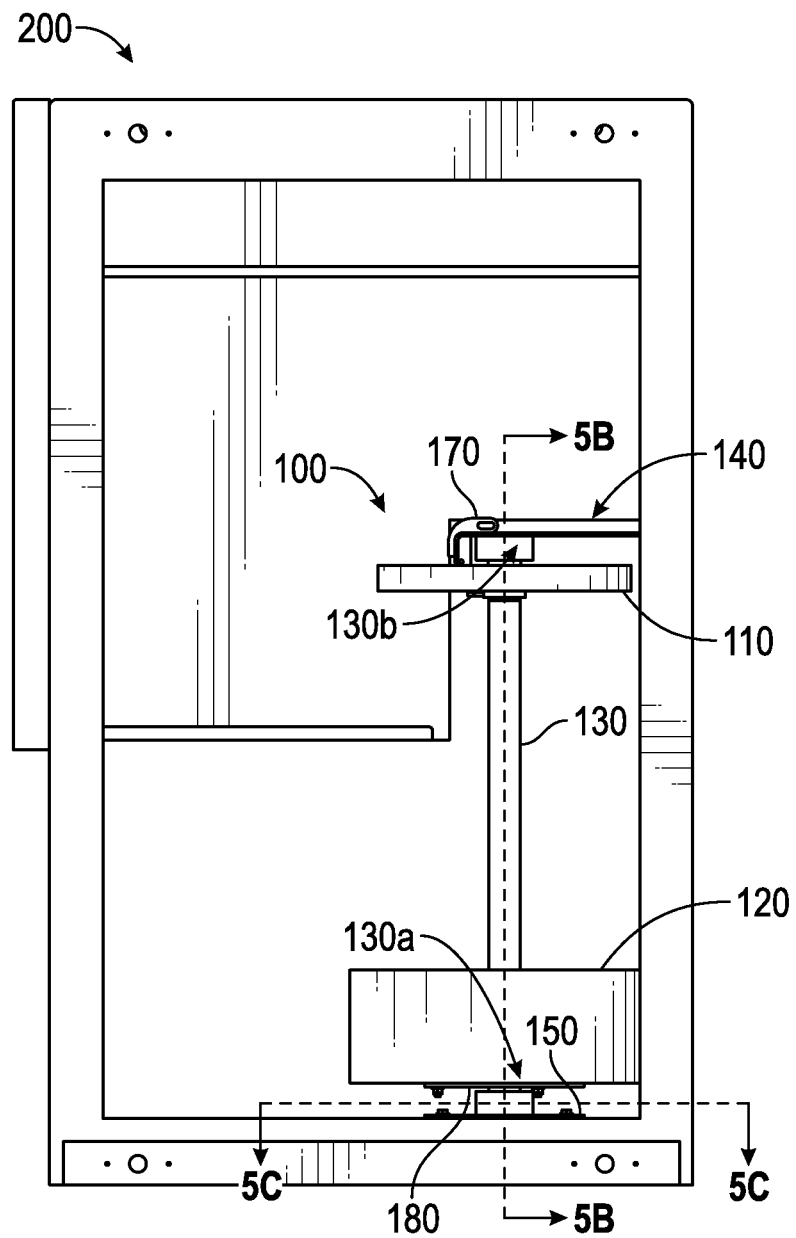
Figure 3D:
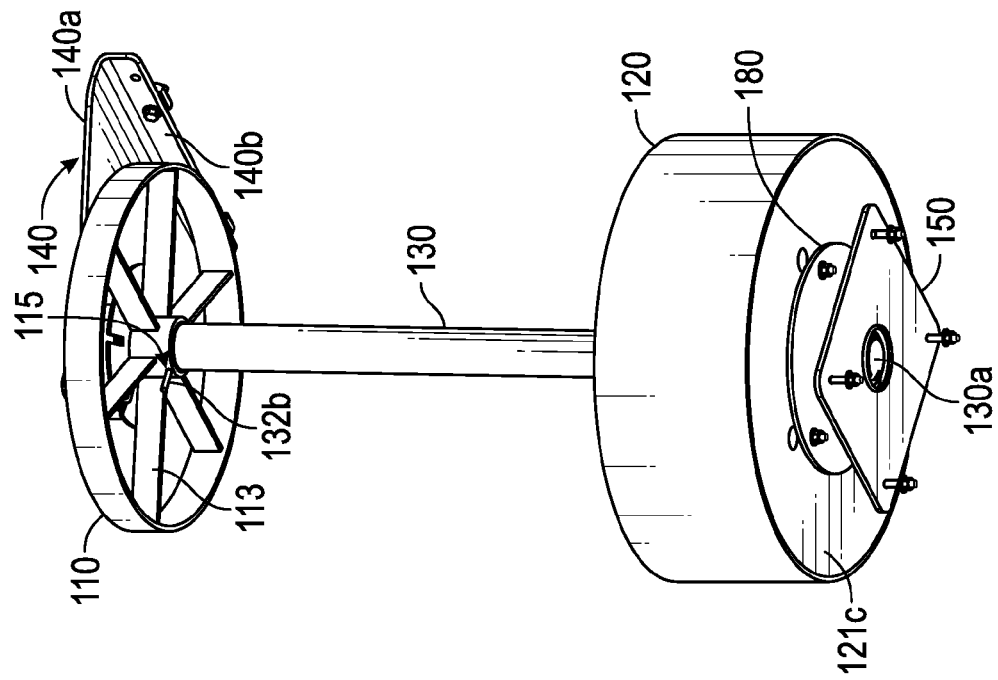
Figure 3C:
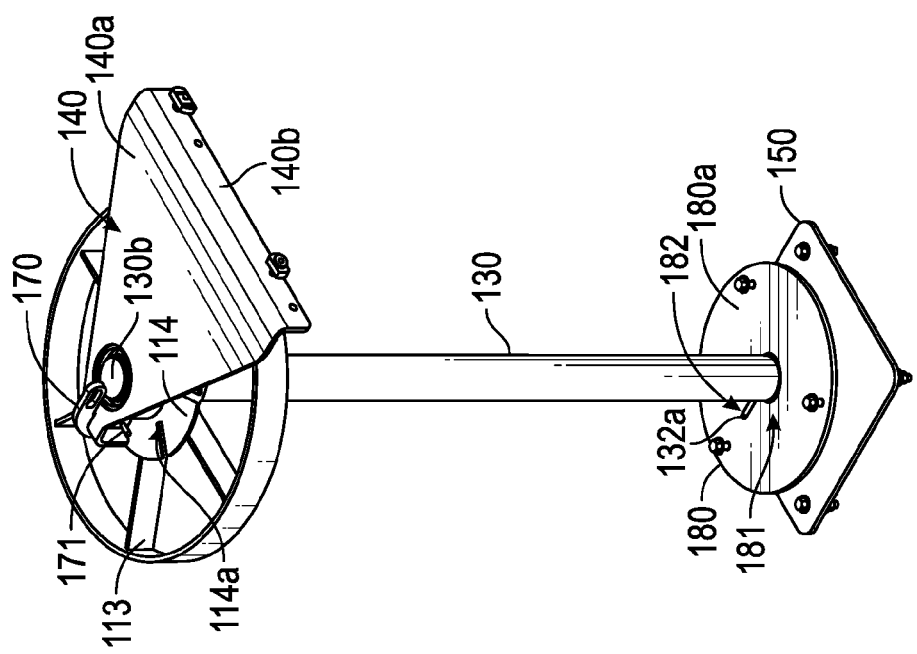
Figure 3E:
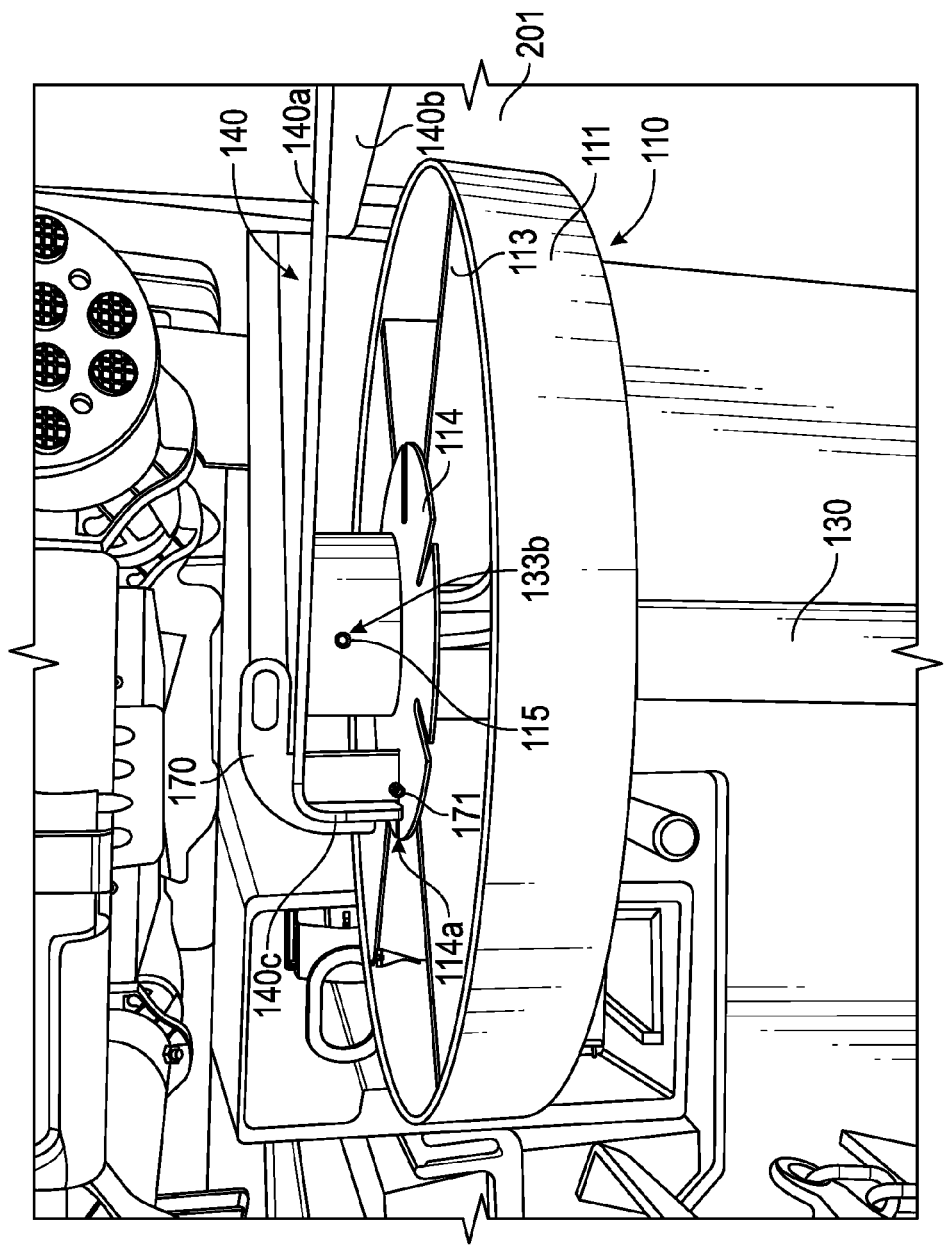
Figure 3F:
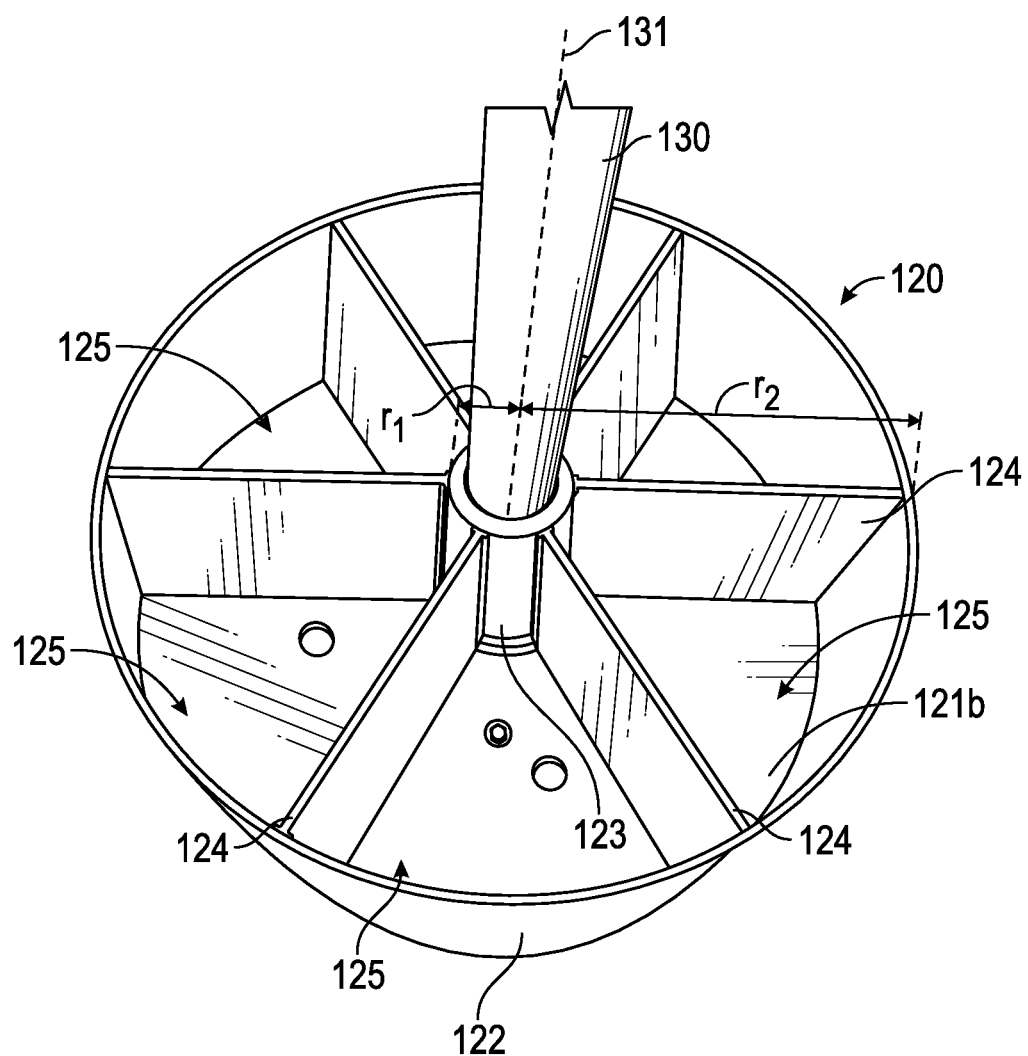
Figure 3G:
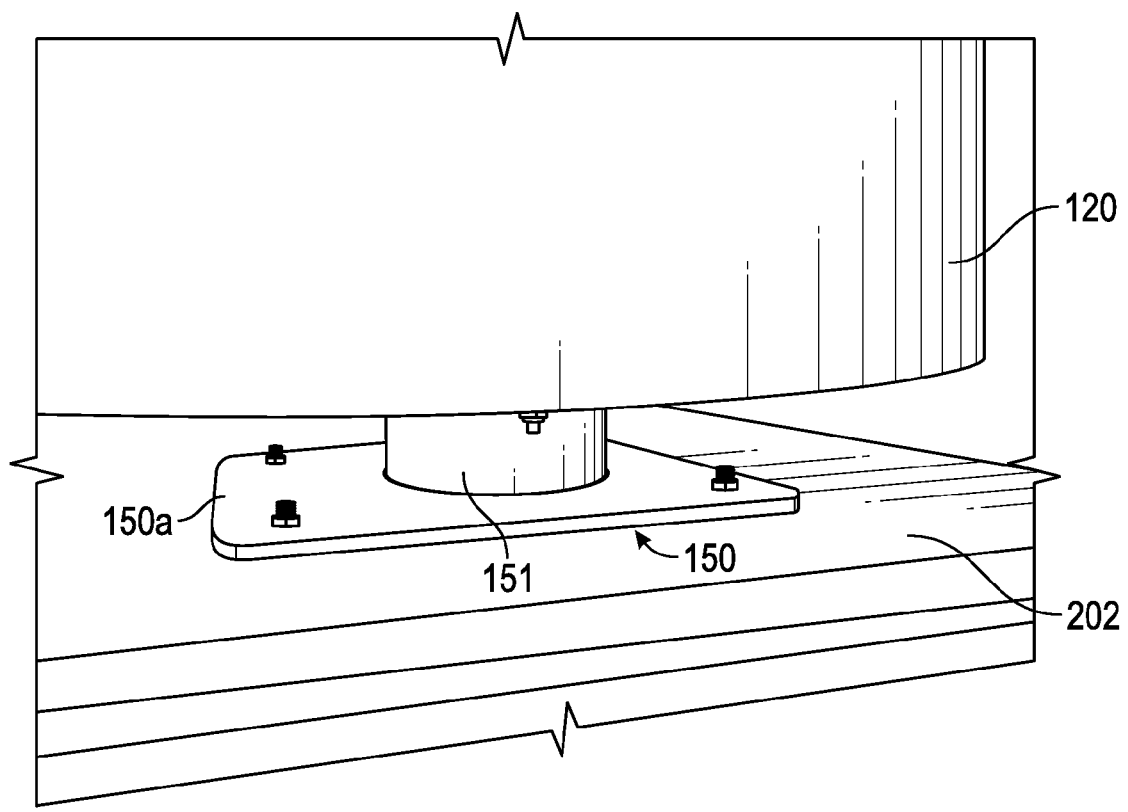
Figure 4:
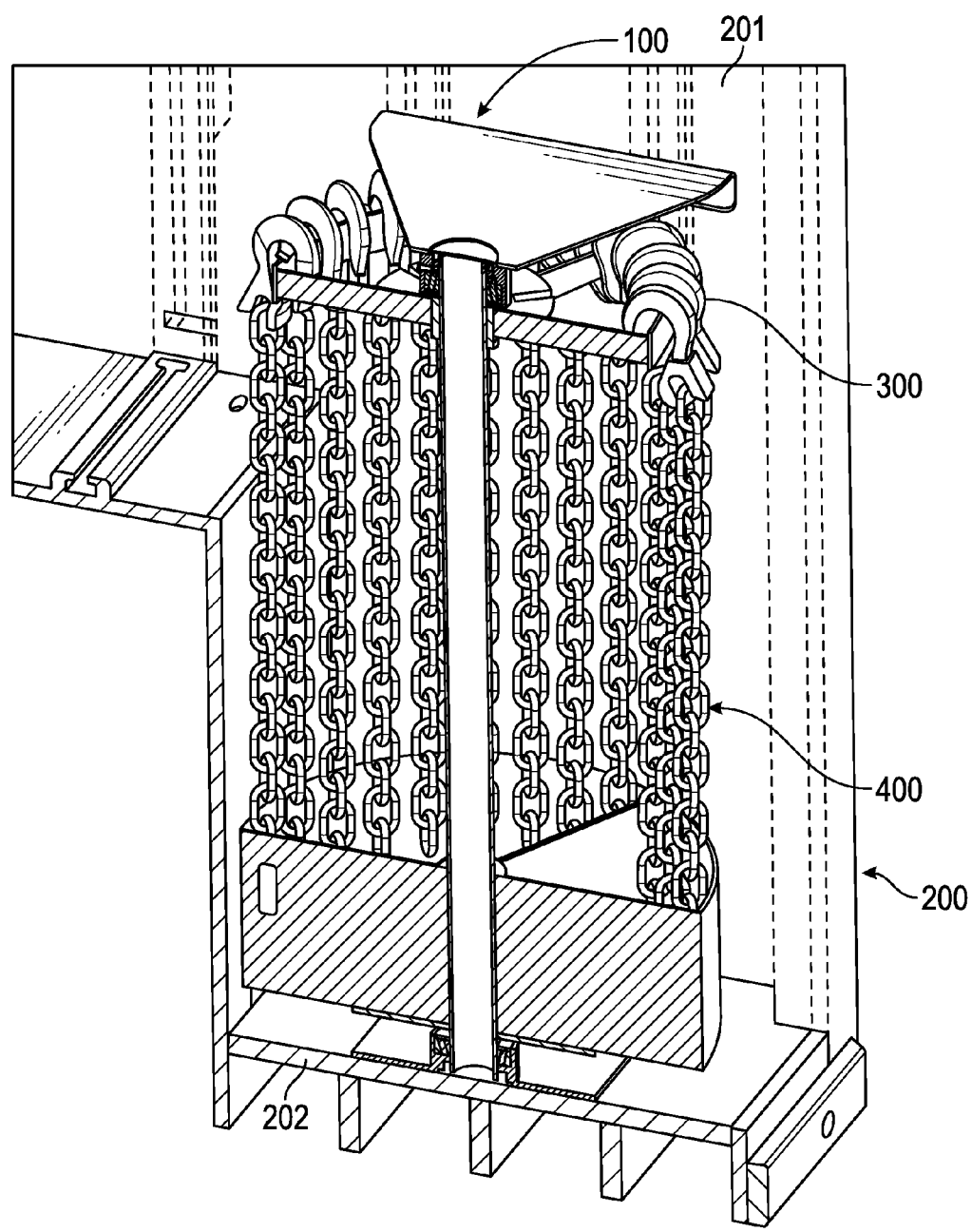
FIG. 4 is a sectional view of a vehicle storage assembly organizing chains, according to an exemplary embodiment.

According to the exemplary embodiment shown in FIGS. 1-4, a vehicle storage assembly, shown as storage assembly 100, is installed in a vehicle, shown as vehicle 200. As shown in FIGS. 3A-3D, the storage assembly 100 includes an upper member, shown as upper member 110 (e.g., a frame, a rack, etc.), and a lower member, shown as lower member 120 (e.g., a bin, a container, etc.), each coupled to a shaft, shown as post 130 (e.g., tubular member, cylindrical member, etc.), at an upper end and a lower end thereof, respectively. As shown in FIGS. 3A-3B, the post 130 is rotatably coupled to an upper support member, shown as upper support member 140 (e.g., an upper mounting plate, panel, bracket, etc.), at a distal end 130b (e.g., an upper end) of the post 130 and to a lower support member, shown as lower support member 150 (e.g., a lower mounting plate, panel, etc.), at a proximal end 130a (e.g., a lower end, etc.) of the post 130. According to various exemplary embodiments, the upper support member 140 and the lower support member 150 are fixed relative to a portion of the vehicle 200 (e.g., a wall, a floor, etc.). The upper member 110 and the lower member 120 may be configured to rotate in unison relative to the upper support member 140 and the lower support member 150 such that an operator may selectively access different portions of the storage assembly 100 and thereby access specific equipment stored thereon. As shown in FIGS. 2 and 4, hooks 300 facilitate storing chains 400 within storage assembly 100.

According to the exemplary embodiment shown in FIGS. 3A-8B, the post 130 is configured to rotate relative to the upper support member 140 and the lower support member 150 about an axis 131 located along the centerline of the post 130. As shown in FIGS. 3A-3G and 8A-8B, the post 130 is cylindrical in shape and extends between the proximal end 130a and the distal end 130b. In the embodiment shown in FIG. 8B, the post 130 includes a proximal aperture 133a and a distal aperture 133b. According to an exemplary embodiment shown in FIGS. 3C-3D and 8B, the proximal aperture 133a receives a proximal securing feature 132a and the distal aperture 133b receives a distal securing feature 132b. The proximal securing feature 132a and the distal securing feature 132b may be used to couple upper member 110 and lower member 120 to post 130. As shown in FIGS. 5A, 5D-7, the post 130 includes an upper bearing surface 130c located at the distal end 130b and a lower bearing surface 130d located at the proximal end 130a. According to an alternative embodiment, the post 130 includes more than two bearing surfaces configured to engage a plurality of bearings (e.g., roller bearings, etc.). As shown in FIG. 5A, the post 130 is rotatably coupled to the upper support member 140 at the upper bearing surface 130c and to the lower support member 150 at the lower bearing surface 130d via one or more rotating members 160. According to an exemplary embodiment, the rotating members 160 are bearings (e.g., roller bearings, etc.) that facilitate rotational movement of the post 130 relative to the upper support member 140 and the lower support member 150.

According to an exemplary embodiment, the upper support member 140 and the lower support member 150 are configured to couple (e.g., fix, etc.) the storage assembly 100 to one or more stationary objects of the vehicle 200 (e.g., a wall, a floor, etc.). As shown in FIGS. 2-4, a portion of the upper support member 140 is coupled to a wall 201 of the vehicle 200, and a portion of the lower support member 150 is coupled to a floor 202 of the vehicle 200 using a plurality of fasteners (e.g., bolts, screws, etc.). The lower support member 150 is configured to support the post 130 along an axial direction and engage the rotating member 160 such that the post 130 rotates relative to the lower support member 150 along the axis 131. The upper support member 140 is coupled to the distal end 130b of the post 130 and engages the rotating member 160 such that the post 130 rotates relative to the upper support member 140 along the axis 131. According to an alternative embodiment, the storage assembly 100 does not include the upper support member 140. The storage assembly 100 may include only one rotating member 160 positioned at the proximal end 130a of the post 130, such that a single rotating member 160 substantially supports the upper member 110, the lower member 120, and the post 130 from below (e.g., at the proximal end 130a of the post 130, etc.). The lower support member 150 may be configured to engage the rotating member 160 such that the post 130 rotates relative to the lower support member 150 along the axis 131.

According to the exemplary embodiment shown in FIGS. 3E and 12A-12C, the upper support member 140 includes a planar panel 140a and a flange 140b coupled to an end of the planar panel 140a. The flange 140b is configured to couple the upper support member 140 to a stationary portion of the vehicle 200, such as the wall 201, using a plurality of fasteners (e.g., bolts, screws, brackets, etc.). In another embodiment, the upper support member 140 is coupled to another portion of vehicle 200 (e.g., a wall, a floor, or a ceiling of a storage compartment located on or within the body of the vehicle 200, etc.). As shown in FIGS. 3E and 12A-12C, the upper support member 140 further includes a side wall 140c coupled to the planar panel 140a opposite the flange 140b. The side wall 140c is perpendicular to the planar panel 140a, according to an exemplary embodiment. As shown in FIGS. 6 and 12A-12C, the side wall 140c defines an aperture, shown as cutout 141 (e.g., a slot, a channel, etc.), extending between a first edge 141a and a second edge 141b. The cutout 141 is configured to receive (e.g., accept, etc.) a locking member, shown as locking member 170 (e.g., a locking mechanism, etc.), to rotationally fix the post 130, the upper member 110, and the lower member 120. In other embodiments, the locking member has another shape and/or otherwise selectively fixes the orientation (e.g., rotational position, etc.) of at least one of the post 130, the upper member 110, and the lower member 120. By way of example, the locking member 170 may include a holding brake. Such a locking member 170 may operate similar to a disc brake (e.g., such that the locking member 170 defines an infinite number of locking positions, etc.) and hold, clamp, or otherwise secure a plate (e.g., disc, etc.) such that the orientation of at least one of the post 130, the upper member 110, and the lower member 120 is selectively fixed in one of the locking positions.

As shown in FIGS. 5A-6, and 12A-12C, the upper support member 140 includes a first housing 142 coupled (e.g., welded, fastened, etc.) to a bottom surface of the planar panel 140a. As shown in FIG. 5E, the first housing 142 includes an inner channel 142a (e.g., an inner wall, a sleeve, etc.) that receives the rotating member 160. As shown in FIGS. 5A and 5E-7, the rotating member 160 is a roller bearing having an outer race 161 that is press fit into the inner channel 142a of the first housing 142. The roller bearing also includes an inner race 162 that is rotatably coupled to the upper bearing surface 130c of the post 130 such that the axial position of the post 130 is fixed, but the post 130 is selectively rotatable relative to the upper support member 140. As shown in FIG. 7, the first housing 142 further includes a grease fitting 143 located along a side of the first housing 142 (e.g., to allow an operator to lubricate or otherwise maintain the rotating member 160, etc.).

Figure 5A:
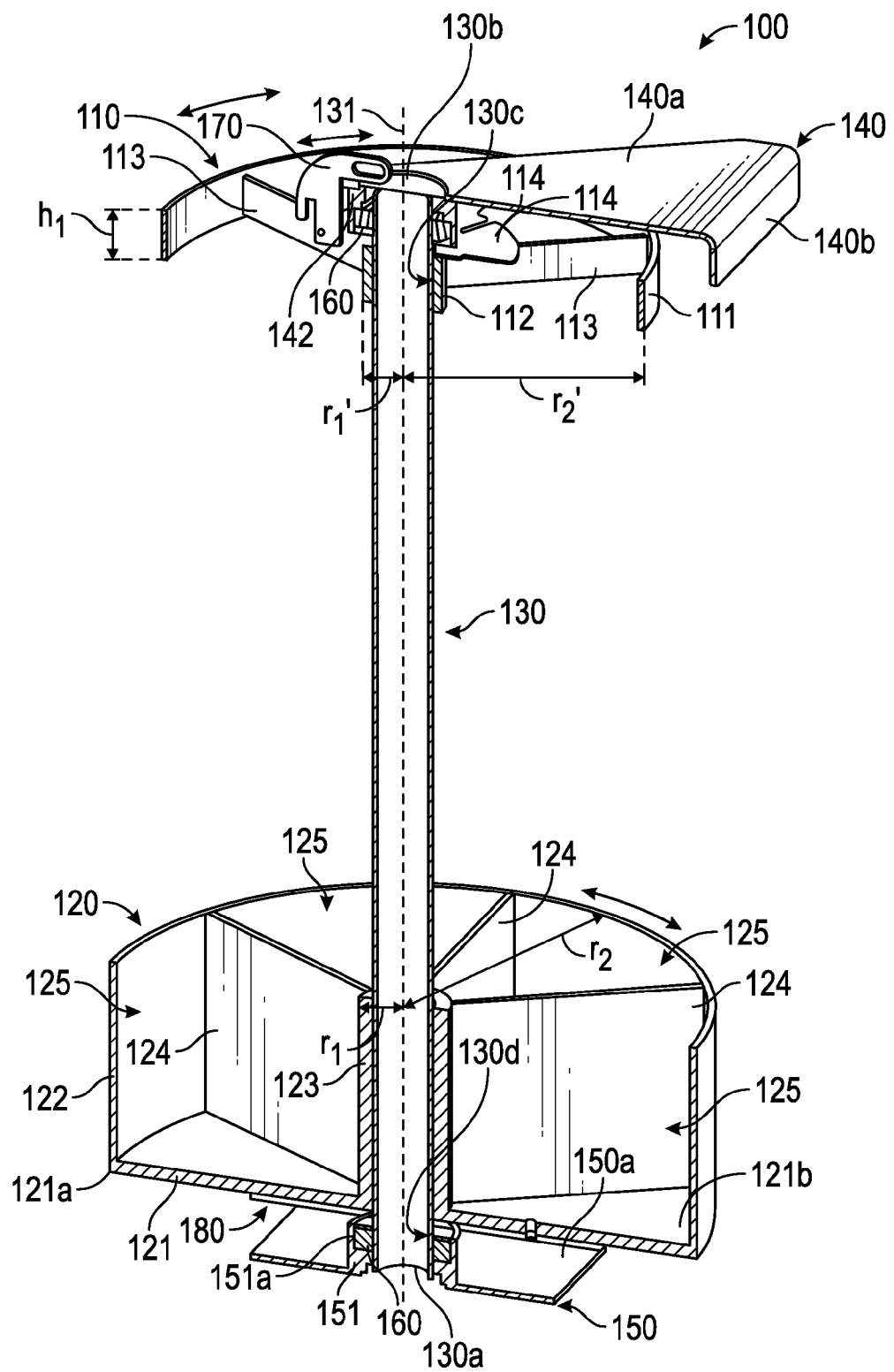
FIGS. 5A-5E are sectional views of a vehicle storage assembly, according to an exemplary embodiment
Figure 5B:
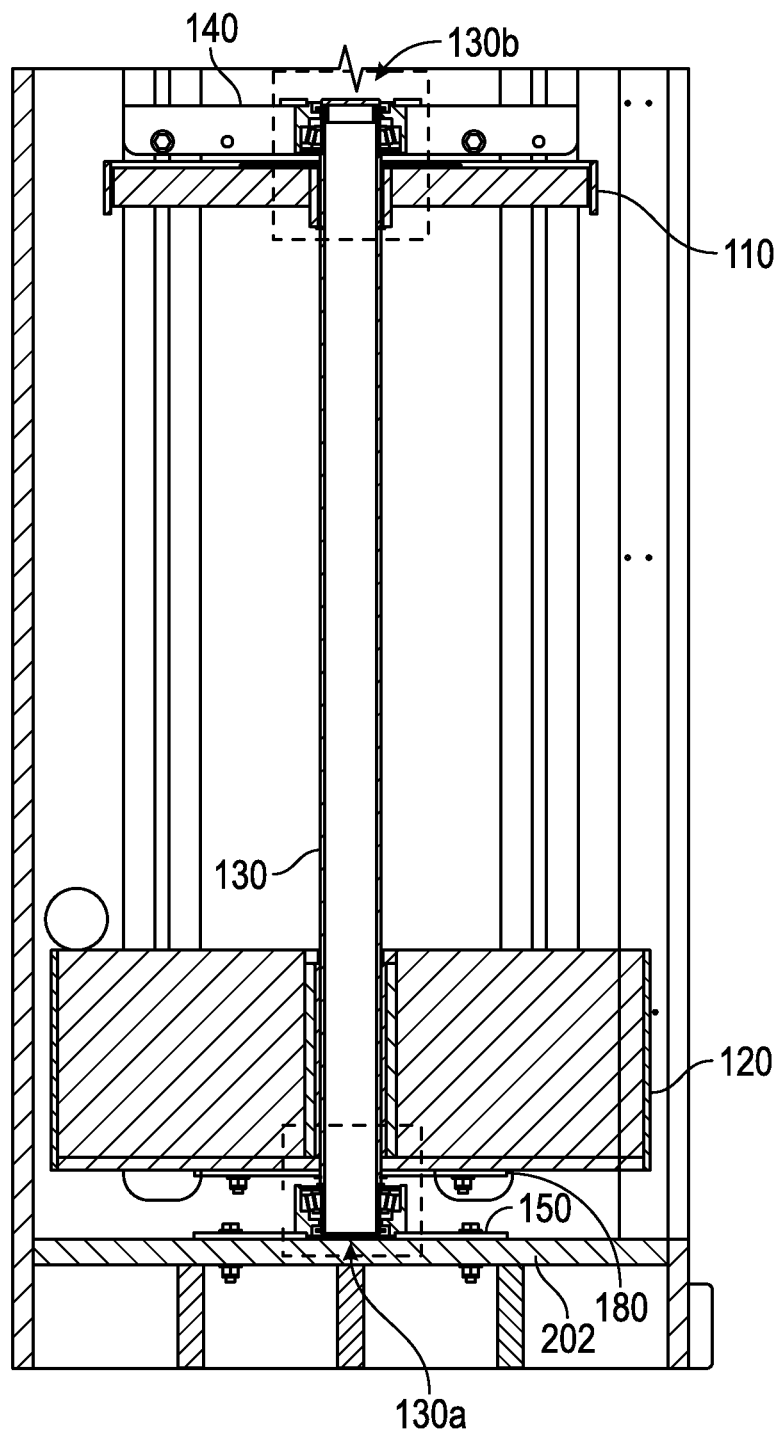
Figure 5C:
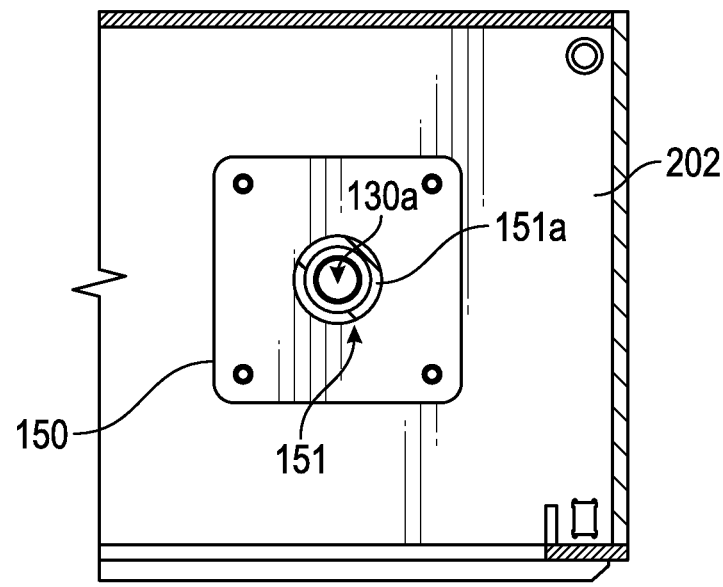
Figure 5D:
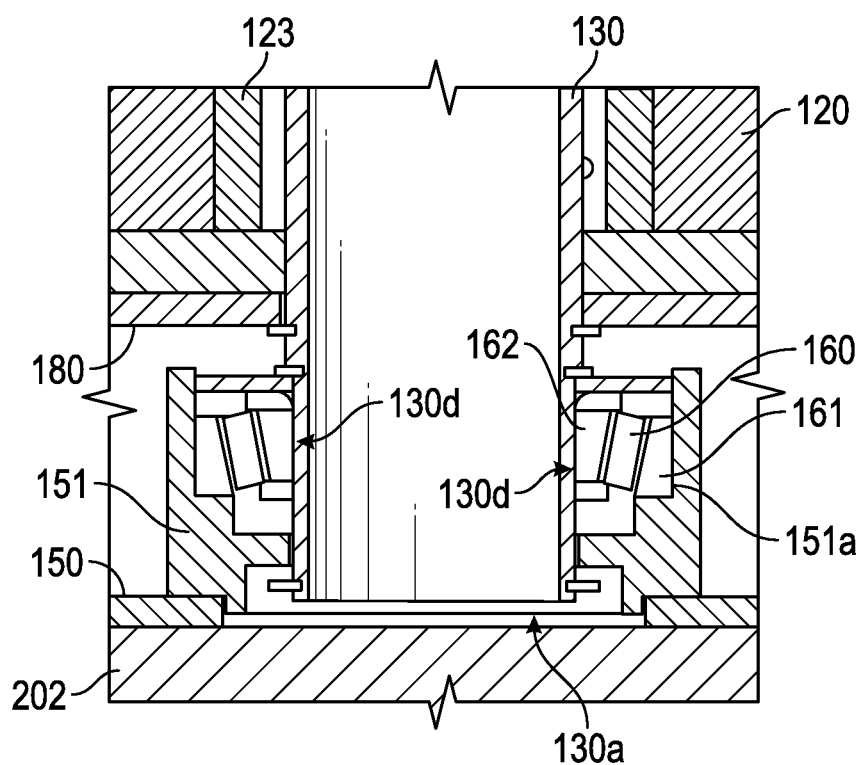
Figure 5E:
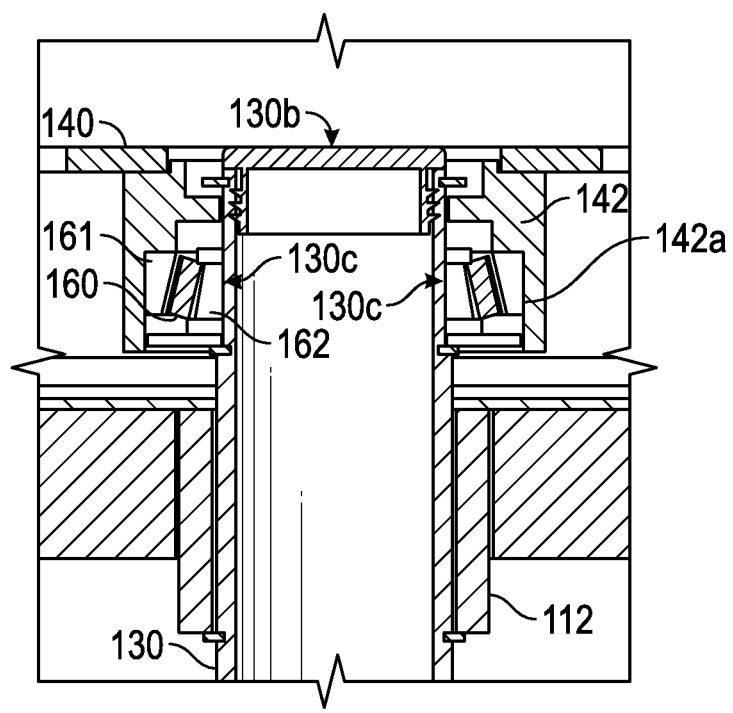

As shown in FIGS. 3G, 5A-5D, and 10A-10C, the lower support member 150 includes a planar base 150a and a second housing 151 coupled (e.g., welded, fastened, etc.) to a top surface of the planar base 150a. The lower support member 150 is configured to be coupled to a stationary object of the vehicle 200, such as the floor 202, with a plurality of fasteners (e.g., bolts, screws, brackets, etc.). As shown in FIGS. 5A and 5D, the outer race 161 of the rotating member 160 is press fit into an inner channel 151a (e.g., an inner wall, a sleeve, etc.) of the second housing 151. The inner race 162 is rotatably coupled to a lower bearing surface 130d of the post 130 such that the axial position of the post 130 is fixed, but the post 130 is selectively rotatable relative to the lower support member 150. In one embodiment, the second housing 151 includes a grease fitting (e.g., to allow an operator to lubricate or otherwise maintain the rotating member 160, etc.).

According to an alternative embodiment, the upper support member 140 does not include the first housing 142. In some embodiments, the storage assembly 100 does not include the upper support member 140. The storage assembly 100 may include only one rotating member 160 positioned at the proximal end 130a of the post 130 (e.g., press fit into the inner channel 151a of the second housing 151, etc.) such that a single rotating member 160 substantially supports the upper member 110, the lower member 120, and the post 130 from below (e.g., with the rotating member 160 and second housing 151, etc.). The lower support member 150 may be configured to engage the rotating member 160 such that the post 130 rotates relative to the lower support member 150 along the axis 131.

According to an exemplary embodiment, the lower member 120 is coupled to a lower portion of the post 130 above the lower bearing surface 130d. The lower member 120 is configured to contain (e.g., hold, store, etc.) various equipment and to rotate in unison with the upper member 110 and the post 130 relative to the upper support member 140 and the lower support member 150.

Figure 9A:
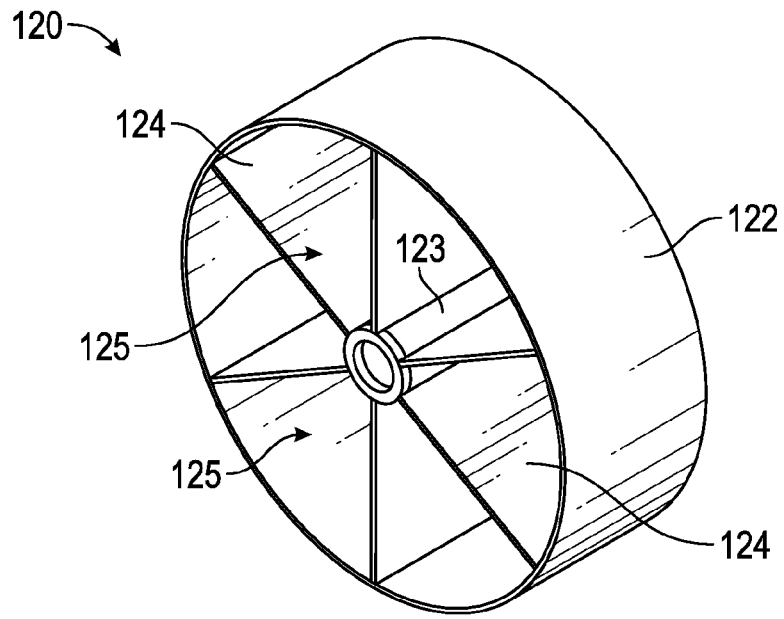
FIGS. 9A-9C are views of a lower member of a vehicle storage assembly, according to an exemplary embodiment.
Figure 9B:
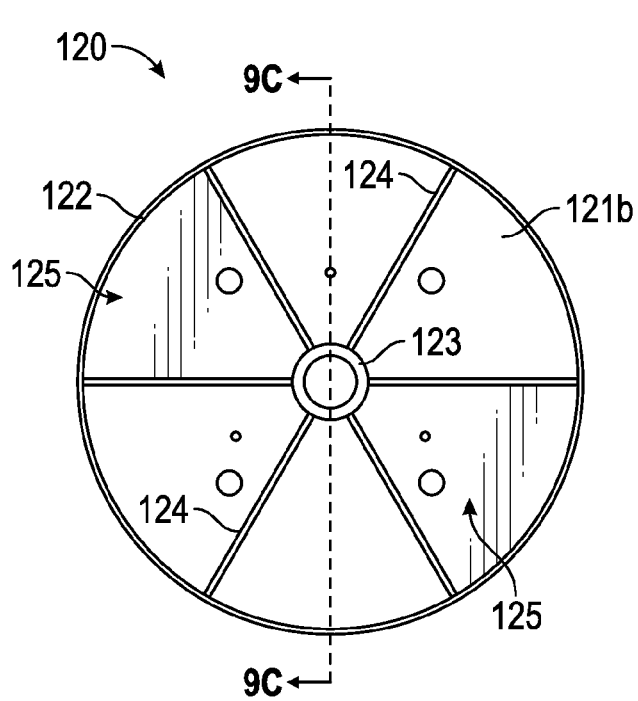
Figure 9C:
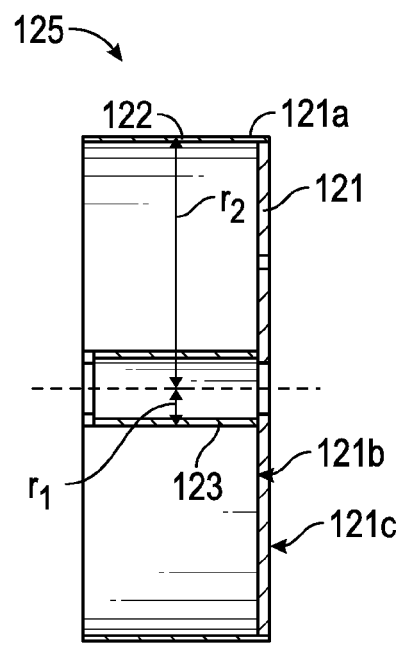
Figure 11A:
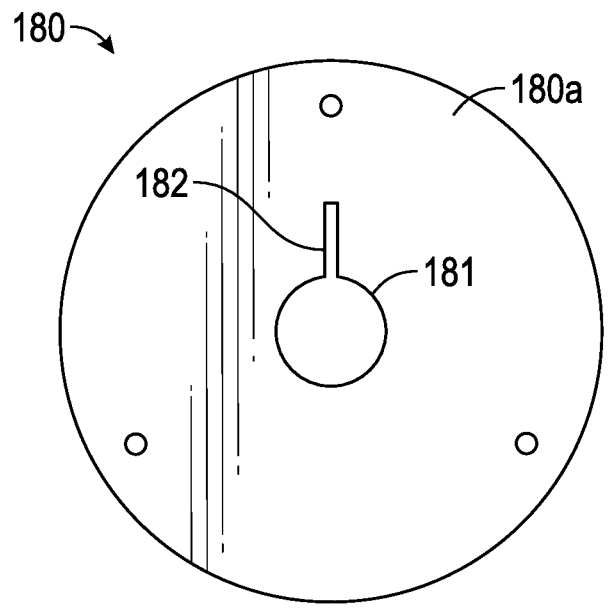
FIGS. 11A-11B are views of a coupling plate of a vehicle storage assembly, according to an exemplary embodiment.
Figure 11B:
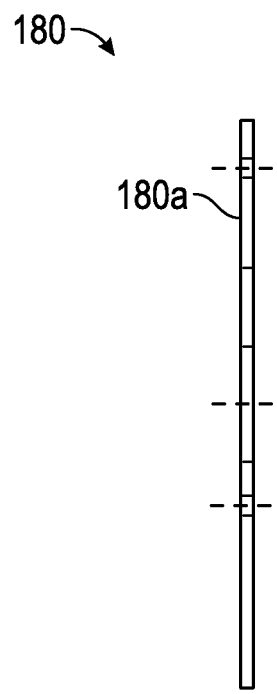
Figure 12A:
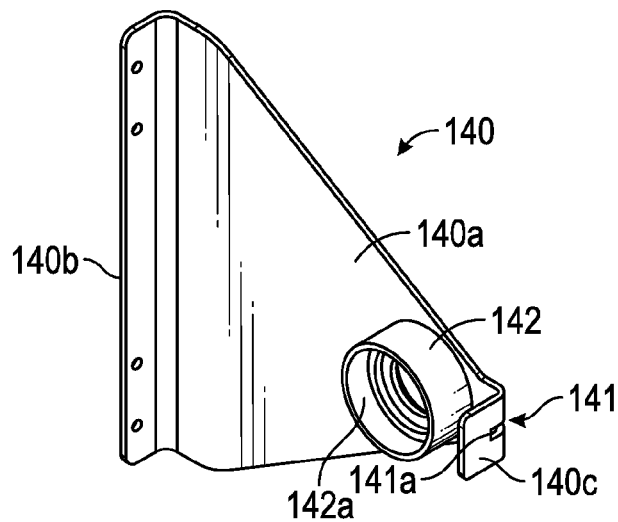
FIGS. 12A-12C are views of an upper support member of a vehicle storage assembly, according to an exemplary embodiment.
Figure 12B:
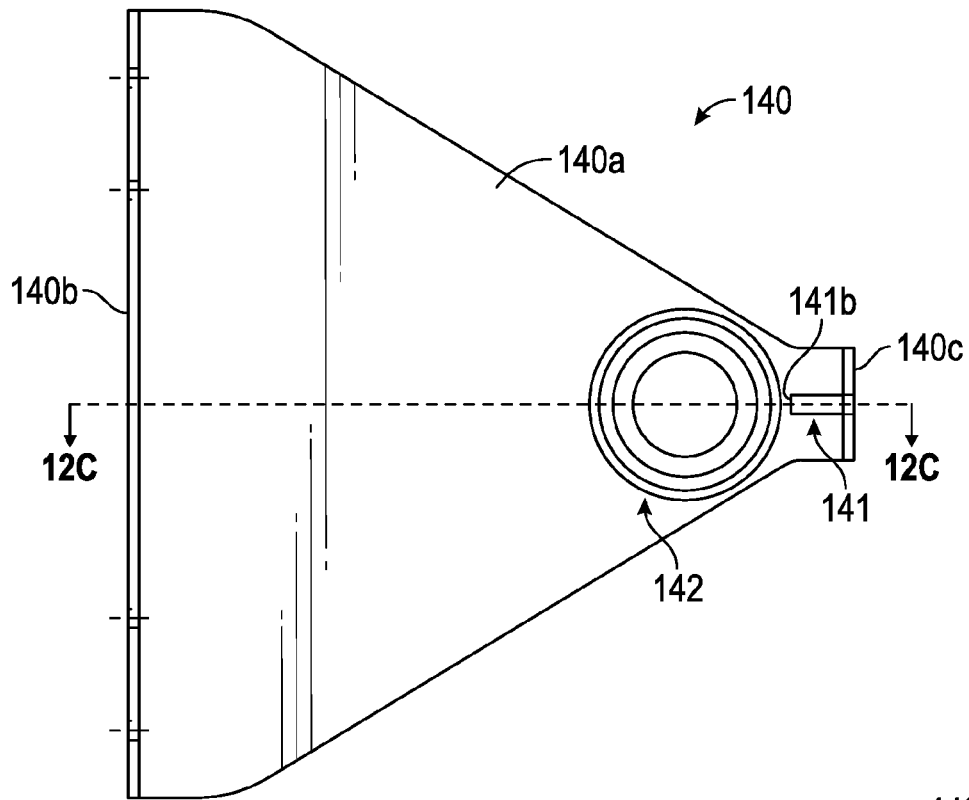
Figure 12C:
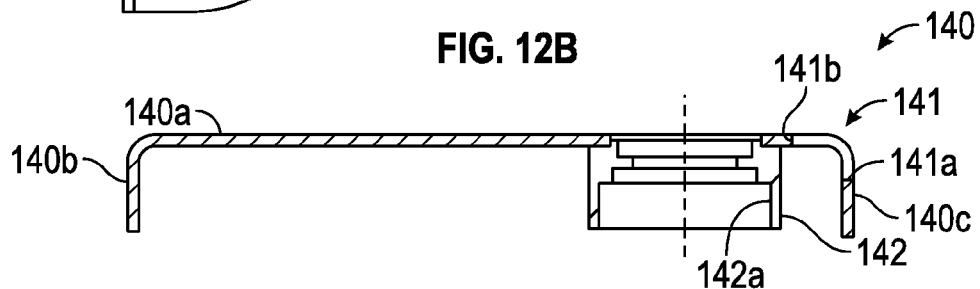

As shown in FIGS. 9A-9C the lower member 120 has a cylindrical shape. In other embodiments, the lower member 120 has another shape (e.g., an open frame, etc.). The lower member 120 includes a bottom panel 121 and an outer panel 122 that is disposed along a peripheral edge 121a of the bottom panel 121. According to other exemplary embodiments, the lower member 120 has another shape (e.g., square, octagonal, etc.). As shown in FIGS. 9A-9C, the lower member 120 includes an inner cylinder 123 (e.g., inner sleeve, inner tube, etc.) having an outer radius $r_1$ that is less than an outer radius $r_2$ of the outer panel 122. In one embodiment, the inner cylinder 123 is located concentrically with the outer panel 122. The inner cylinder 123 is configured to couple the lower member 120 to the post 130 (e.g., using one or more roll pins or other fasteners, etc.). The inner cylinder 123 is coupled to a top surface 121b of the bottom panel 121. The inner cylinder 123 is coupled to the outer panel 122 via one or more partitions 124 (e.g., dividers, separators, etc.). The partitions 124, the outer panel 122, and the bottom panel 121 cooperatively define a plurality of cavities 125 (e.g., storage sections, etc.) within the lower member 120 to contain (e.g., store, hold, etc.) various equipment (e.g., chains, hooks, etc.). As shown in FIGS. 2 and 4, the plurality of chains 400 may be stored within one or more of the plurality of cavities 125.

According to the exemplary embodiment shown in FIGS. 3C-3D and 11A-11B, the lower member 120 is coupled to the lower portion of the post 130 with a member, shown as coupling plate 180. The coupling plate 180 includes a top surface 180a and defines an aperture 181 having a keyway 182. As shown in FIG. 3C, the aperture 181 receives the lower portion of the post 130. The proximal aperture 133a of the post 130 receives the proximal securing feature 132a. The proximal securing feature 132a may be received by the keyway 182, thereby rotatably securing the coupling plate 180 (e.g., to prevent rotation of the coupling plate 180 relative to the post 130, etc.). As shown in FIGS. 3C-3D, the bottom surface 121c of the bottom panel 121 of the lower member 120 is disposed along (e.g., contacts, etc.) the top surface 180a of the coupling plate 180. In one embodiment, the lower member 120 is coupled to the coupling plate 180 with a plurality of fasteners (e.g., bolts, screws, rivets, etc.), such that the lower member 120 and the coupling plate 180 do not rotate relative to the post 130. In other embodiments, the lower member 120 is secured to the post 130 without the coupling plate 180 (e.g., the inner sleeve 112 is tapered, attached to the post 130 with an adhesive, directly fastened to the post 130, etc.).

Figure 13A:
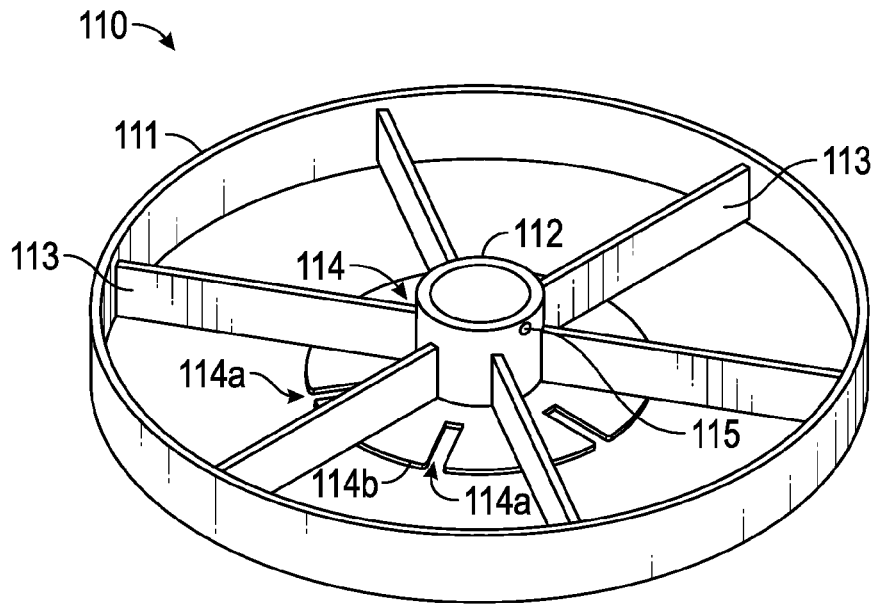
FIGS. 13A-13C are views of an upper member of a vehicle storage assembly, according to an exemplary embodiment.

According to the exemplary embodiment shown in FIGS. 3A-3E, 4-5A, 5E, and 13A-13C, the upper member 110 is coupled to an upper portion of the post 130 below the upper bearing surface 130c. As shown in FIG. 13A, the upper member 110 defines an aperture 115. As shown in FIG. 3E, the distal aperture 133b aligns with the aperture 115. As shown in FIG. 3D, the distal aperture 133b and the aperture 115 receive distal securing feature 132b. The distal securing feature 132b rotatably secures the upper member 110 to the post 130 (e.g., to prevent rotation of the upper member 110 relative to the post 130, etc.). In other embodiments, the upper member 110 is rotatably secured to the post 130 in another manner (e.g., with an adhesive, fasteners, tapered locking, etc.).

In one embodiment, the upper member 110 defines a frame that is configured to support a rigging accessory. The rigging accessory may include at least one of a chain, a shackle, a hook, a snatch block, and a frame fork. As shown in FIGS. 2 and 4, a portion of the upper member 110 is configured to receive hooks 300 and thereby support chains 400. In other embodiments, a portion of the upper member 110 is configured to otherwise support chains 400 (e.g., chains 400 may be draped over a portion of upper member 110, etc.). In still other embodiments, the upper member 110 is configured to otherwise support various equipment. By way of example, the equipment may be held by, supported by, hung upon, or otherwise supported by the upper member 110. Chains 400 or the other equipment supported by the upper member 110 may rotate in unison with the post 130 and lower member 120 relative to the upper support member 140 and the lower support member 150.

As shown in FIGS. 3C-3E, 5A, and 13A-13C, the upper member 110 is circular in shape and includes an outer wall 111 that forms an outer periphery of the upper member 110. Outer wall 111 may have a cylindrical shape, a hoop shape, an annular or ring shape, or still another shape. The outer wall 111 may have a rectangular or circular cross-sectional shape, among other alternatives. According to other exemplary embodiments, the upper member 110 may be another shape (e.g., square, octagonal, etc.). The outer wall 111 extends a height $h_1$ that is sized to receive (e.g., hang, engage, etc.) various hooks having different sizes for use in tow trucks. The upper member 110 further includes an inner sleeve 112 having a radius $r_1'$ that is less than a radius $r_2'$ of the outer wall 111. In one embodiment, the inner sleeve 112 is positioned concentrically with the outer wall 111. The inner sleeve 112 is configured to couple the upper member 110 to the post 130 (e.g., using one or more roll pins or other fasteners). The inner sleeve 112 is coupled to the outer wall 111 with a plurality of supports, shown as divider walls 113 (e.g., partition walls, separators, etc.). The divider walls 113 and the partitions 124 of lower member 120 may be aligned and spaced around the circumference of the outer wall 111 and the outer panel 122 (e.g., at various angular distances relative to each other). Each of the one or more divider walls 113 provides structural support to the outer wall 111 and improves organization by providing designated sections within the upper member 110 to hang various equipment (e.g., chains 400, hooks 300, shackles, hooks, frame forks, etc.). As shown in FIGS. 2 and 4, a plurality of hooks 300 are hung along the outer wall 111 and are separated or otherwise organized between the divider walls 113.

Figure 13B:
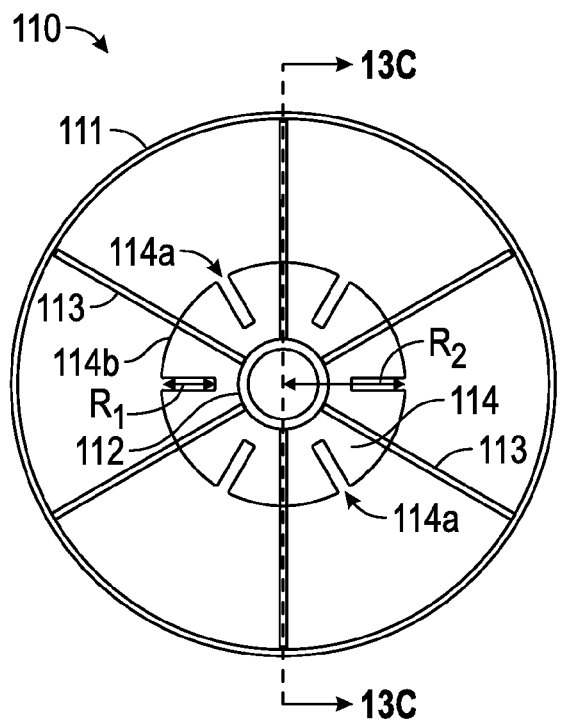
Figure 13C:
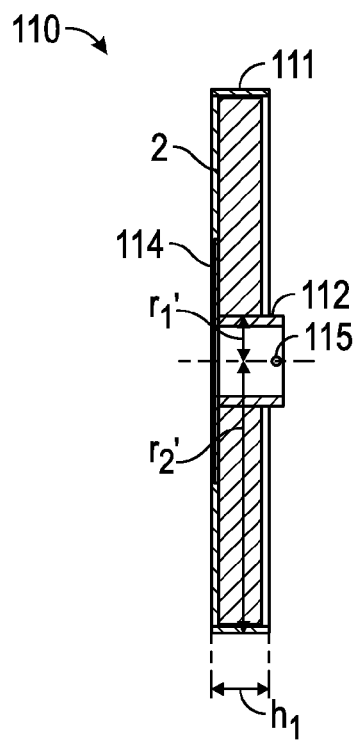

According to an exemplary embodiment, the upper member 110 includes a locking plate 114 (e.g., disc member, panel, etc.). As shown in FIGS. 3E and 13A-13B, locking plate 114 is circular. In other embodiments, locking plate 114 has another shape (e.g., rectangular, square, oval-shaped, etc.). According to the exemplary embodiment shown in FIG. 5A, locking plate 114 is disposed above the inner sleeve 112. As shown in FIG. 5A, the locking plate 114 is coupled to a top surface of the inner sleeve 112. According to an exemplary embodiment, locking plate 114 is configured to provide an interface for locking or otherwise limiting the movement of the upper member 110, post 130, and lower member 120. By way of example, locking plate 114 may prevent the upper member 110, post 130, and lower member 120 from rotating relative to the upper support member 140 and the lower support member 150. According to other exemplary embodiments, the locking plate 114 is integrally formed with the upper member 110.

Figure 6:
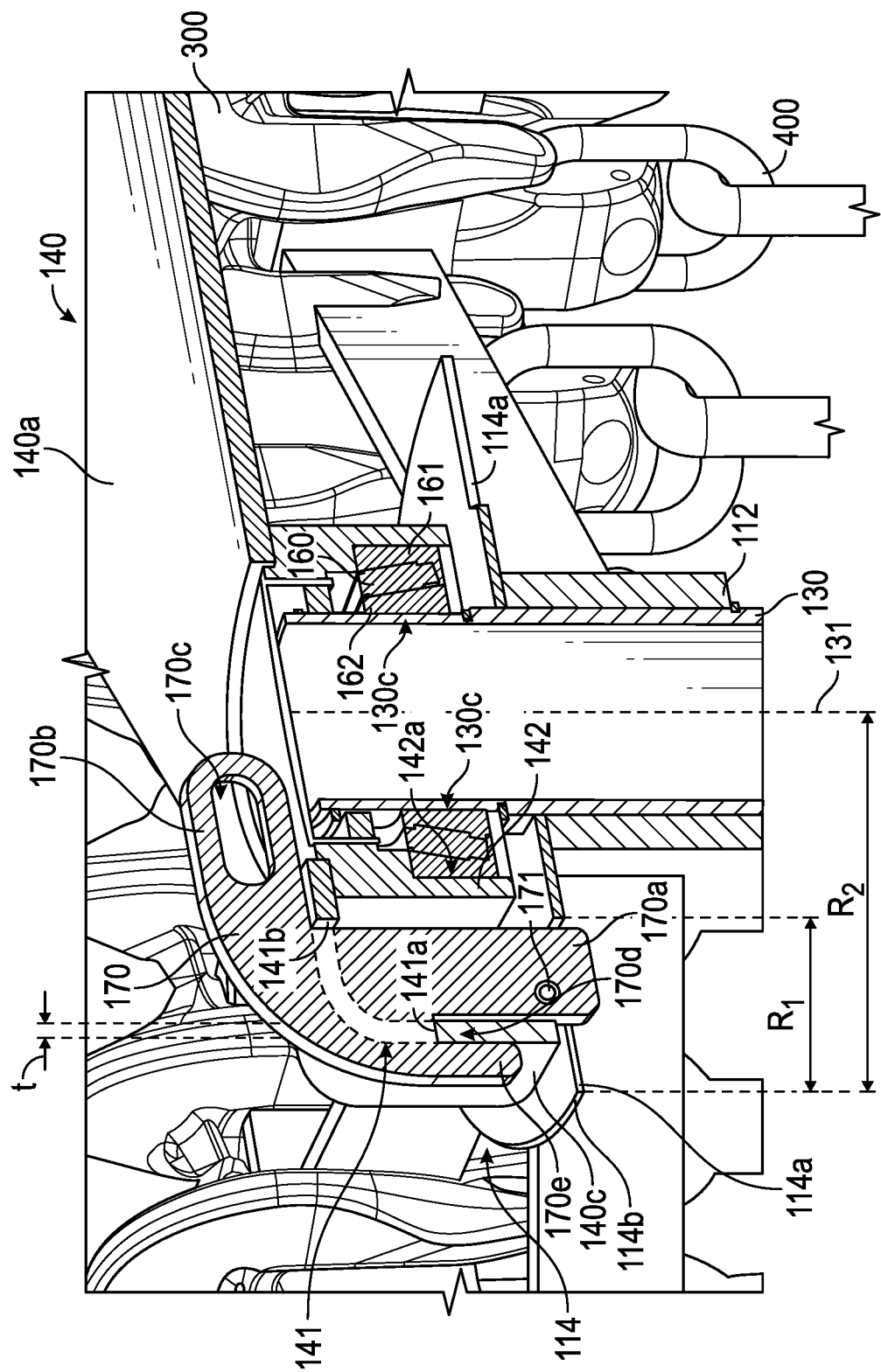
FIG. 6 is a sectional view of a vehicle storage assembly organizing chains, according to an exemplary embodiment.
Figure 7:
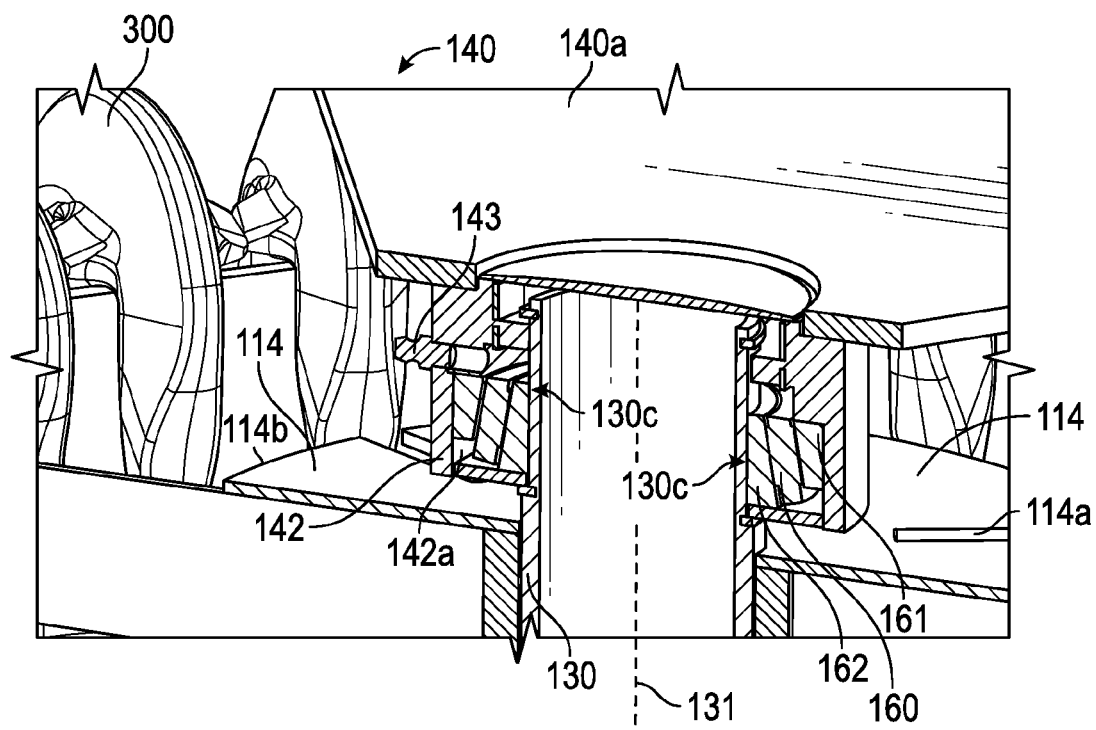
FIG. 7 is a sectional view of a vehicle storage assembly organizing chains, according to an exemplary embodiment.
Figure 8A:
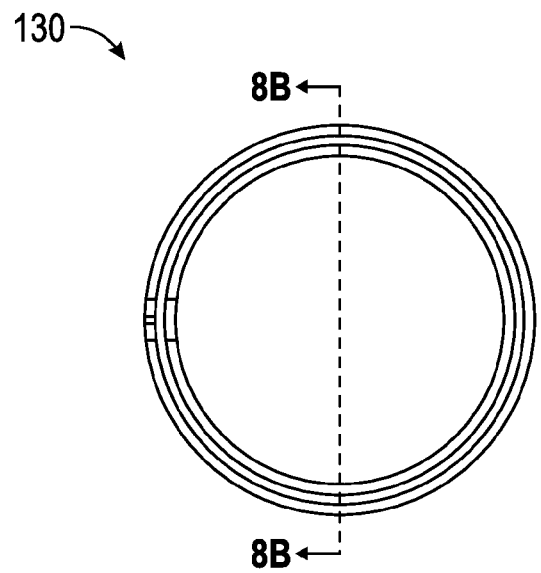
FIGS. 8A-8B are views of a post of a vehicle storage assembly, according to an exemplary embodiment.
Figure 8B:
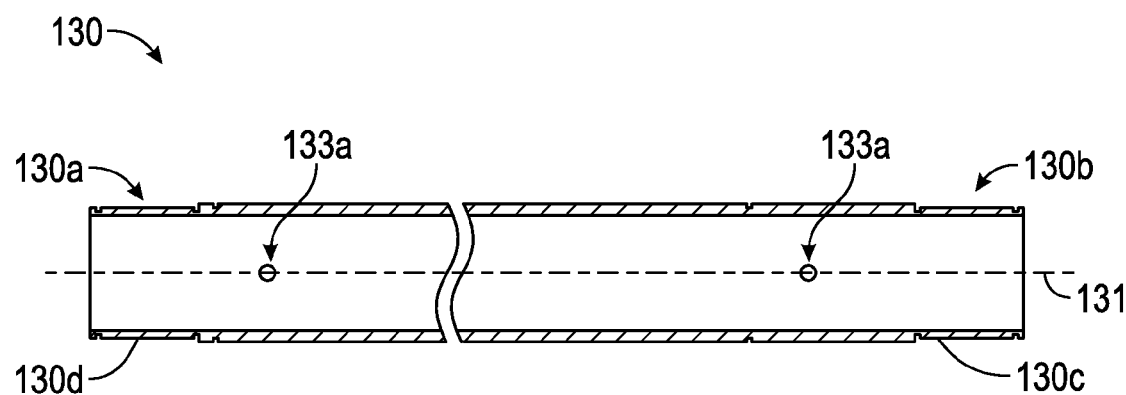

As shown in FIGS. 6 and 13A-13B, the locking plate 114 is planar and defines a plurality of slots 114a spaced around a circumferential edge 114b. As shown in FIGS. 6 and 13B, the slots 114a extend inward from the circumferential edge 114b a radial distance $R_1$ that is less than an outer radius $R_2$ of the locking plate 114. The slots 114a may be angularly offset relative to each other along the circumferential edge 114b of the locking plate 114. The slots 114a are configured to align with the cutout 141 of the upper support member 140 when the upper member 110 and the lower member 120 are rotated into a plurality of locking positions. By way of example, an operator may rotate the upper member 110 and the lower member 120 with the post 130 to selectively align a slot 114a on the locking plate 114 with the cutout 141 on the upper support member 140 to allow an operator to insert a locking member, shown as locking member 170, into the cutout 141 and the slot 114a to prevent the post 130, the upper member 110, and the lower member 120 from rotating. In other embodiments, the locking member 170 includes a holding brake. The locking plate 114 may be a solid disk or plate (e.g., the locking plate 114 may not define a plurality of slots 114a spaced around the circumferential edge 114b, etc.). Such a locking member 170 may operate similar to a disc brake and hold, clamp, or otherwise secure the locking plate 114 (e.g., such that the locking member 170 defines an infinite number of locking positions, etc.).

According to the exemplary embodiment shown in FIGS. 3A-3C, 3E, 5A, and 6, the locking member 170 is planar. In one embodiment, the locking member 170 is a L-shaped plate and configured to prevent the post 130, the upper member 110, and the lower member 120 from rotating relative to the upper support member 140 and the lower support member 150. The locking member 170 is configured to engage (e.g., contact sides of, extend through, etc.) the cutout 141 of the upper support member 140 and a corresponding slot 114a of the locking plate 114 to prevent (e.g., limit, restrict, etc.) relative motion there between.

As shown in FIG. 6, the locking member 170 includes a first leg 170a and an arm 170b extending from the first leg 170a. In the locking position shown in FIG. 6, the first leg 170a extends downward through a slot 114a. The arm 170b defines an aperture 170c (e.g., an opening, a hole, etc.) that facilitates manually moving the locking member 170. The first leg 170a has a thickness "t" that is less than the size (e.g., width, etc.) of the cutout 141 in the upper support member 140 and the slots 114a on the locking plate 114 such that the first leg 170a can be inserted or otherwise installed into the cutout 141 and into a corresponding slot 114a. The leg further includes a channel 170d that extends upward from a bottom portion of the first leg 170a (e.g., toward the arm 170b, etc.) to define a second leg 170e. In one embodiment, the second leg 170e is parallel to the first leg 170a. The channel 170d is configured to receive the side wall 140c and guide the locking member 170 into the cutout 141 and a corresponding slot 114a. The channel 170d is further configured to engage (e.g., contact, etc.) an edge (e.g., the first edge 141a) of the cutout 141 such that the locking member 170 is retained at least in part by the upper support member 140 when the locking member is in a locked position (e.g., a first state, etc.). As shown in FIG. 6, the locking member 170 further includes a retaining feature, shown as retaining feature 171 (e.g., a pin, a protrusion, etc.). In one embodiment, retaining feature 171 is positioned toward an end of the first leg 170a. The retaining feature 171 extends outward from (e.g., perpendicular to, etc.) a planar surface of the locking member 170. The retaining feature 171 is configured to prevent the locking member 170 from being removed (e.g., pulled-out, etc.) from the cutout 141. This is particularly advantageous and reduces the risk that an operator may misplace or lose the locking member 170. As shown in FIG. 3A, the retaining feature 171 contacts upper support member 140 when locking member 170 is disengaged.

As shown in FIGS. 3E, 5A, and 6, the storage assembly 100 is configured in a first or locked state wherein the post 130, upper member 110, and lower member 120 are rotationally fixed relative to the upper support member 140 and the lower support member 150. With the storage assembly 100 in the first state, the locking member 170 extends through the upper support member 140 and a slot 114a of the locking plate 114. As shown in FIGS. 3E, 5A, and 6, the channel 170d of the locking member 170 engages (e.g., in contact with, etc.) first edge 141a of the cutout 141, and the retaining feature 171 engages a top surface of the locking plate 114. The upper portion of the first leg 170a is disposed within the cutout 141, and the lower portion of the first leg 170a is disposed within a slot 114a of the locking plate 114. In the first state, if an operator or road-induced vibrations attempts to rotate the storage assembly 100 (e.g., the top, upper member 110, lower member 120, etc.), the first leg 170a will interfere (e.g., engage, contact, etc.) with an edge of the slot 114a and will prevent (e.g., restrict, limit, etc.) the storage assembly 100 from rotating. In this manner, the post 130, upper member 110, and lower member 120 are rotationally fixed relative to the upper support member 140 and the lower support member 150. Such a configuration may facilitate use when an operator is loading or unloading chains 400 into storage assembly 100 or when vehicle 200 is moving (e.g., to prevent undesired rotation, etc.).

With storage assembly 100 in the second or unlocked state as shown in FIG. 3A, the post 130, upper member 110, and lower member 120 may be free to rotate (e.g., manually, automatically by way of an actuator, etc.) relative to the upper support member 140 and the lower support member 150. The locking member 170 is removed from a slot 114a of the locking plate 114, but retained within the cutout 141 at least in part by the retaining feature 171. The retaining feature 171 may contact an inner surface of the side wall 140c of the upper support member 140. The second leg 170e of the locking member 170 may rest against an outer surface of the side wall 140c when the storage assembly 100 is configured in the second state. From this position, an operator may rotate at least one of the post 130, upper member 110, and lower member 120 to access a different section or location of the storage assembly 100. After an operator rotates the storage assembly 100 to a desired position or access point, the operator can move (e.g., translate, rotate, slidably dispose, etc.) the locking member 170 into a corresponding slot 114a of the locking plate 114 to lock or otherwise secure the storage assembly 100 in position (i.e., returning the storage assembly 100 to the first state).

In this manner, the storage assembly 100 provides for improved accessibility and organization of equipment (e.g., chains, shackles, frame forks, hooks, tools, etc.). Furthermore, the storage assembly 100 disclosed herein is compact, simple, reliable, and easy to use.

Figure 14:
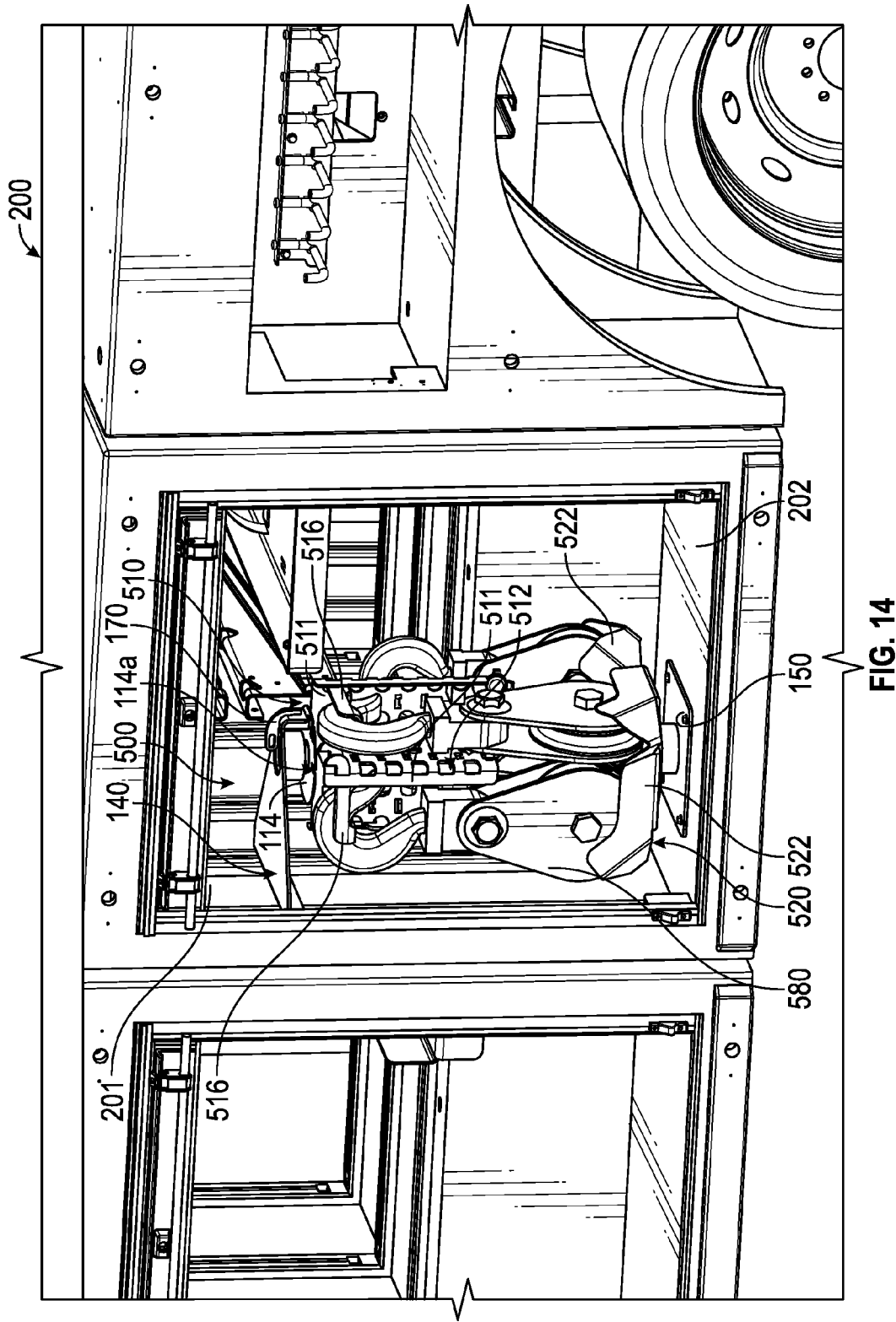
FIG. 14 is a side perspective view of a plurality of snatch blocks organized within a vehicle storage assembly that is installed on a vehicle, according to an exemplary embodiment.
Figure 15:
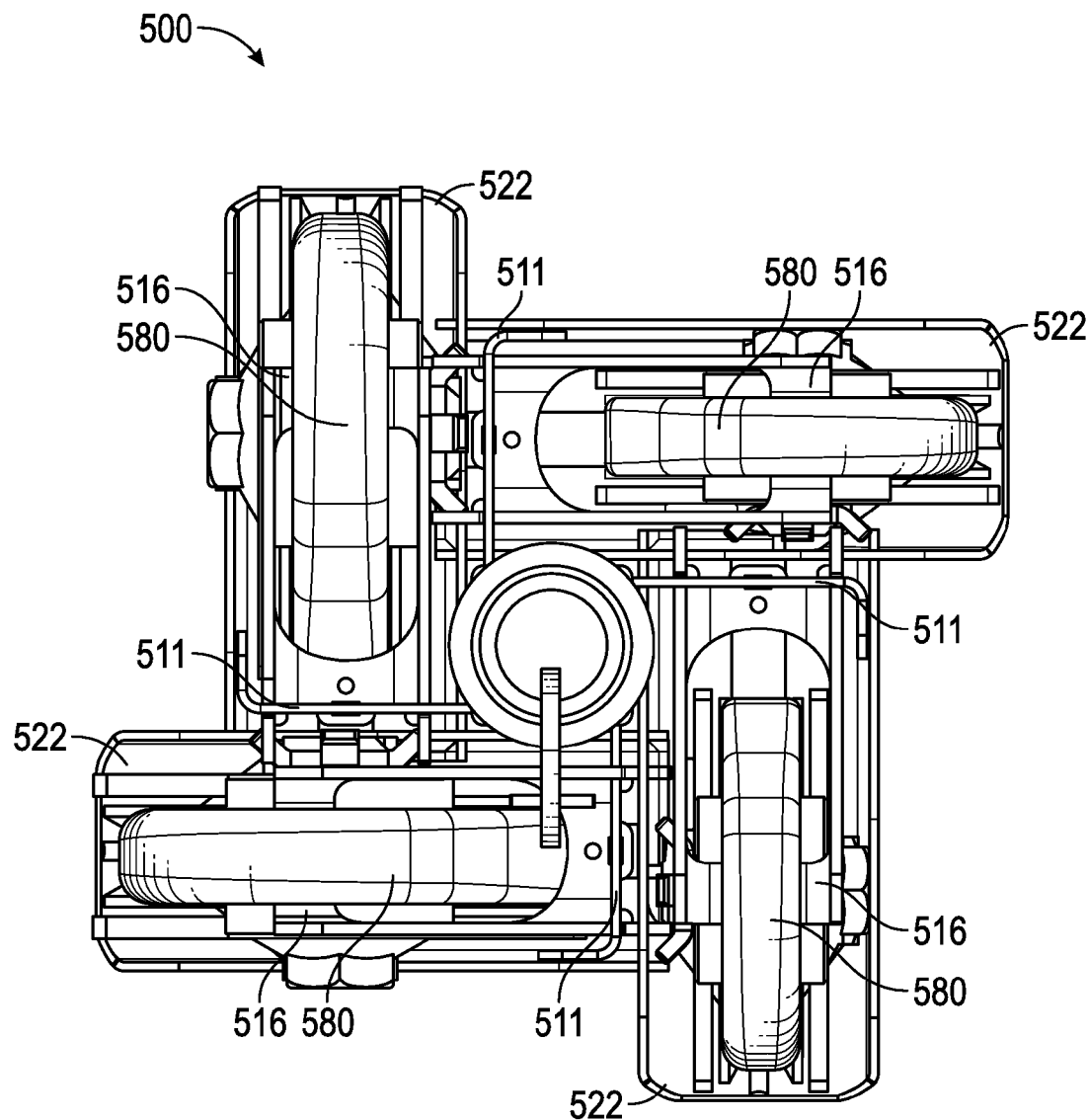
FIG. 15 is a top view of a plurality of snatch blocks organized within a vehicle storage assembly, according to an exemplary embodiment.

According to an exemplary embodiment shown in FIGS. 14-15, a storage assembly, shown as storage assembly 500, is installed as part of vehicle 200. As shown in FIGS. 14-15, the storage assembly 500 includes an upper member, shown as upper member 510 (e.g., a frame, a rack, etc.), and a lower member, shown as lower member 520 (e.g., a bin, a container, etc.). The upper member 510 is rotatably coupled to an upper support member, shown as upper support member 140. The lower member 520 is rotatably coupled to a lower support member, shown as lower support member 150. As shown in FIG. 14, the upper support member 140 is fixed to the wall 201 of the vehicle 200 and the lower support member 150 is fixed to the floor 202 of the vehicle 200. The upper member 510 and the lower member 520 are configured to rotate in unison relative to the upper support member 140 and the lower support member 150 such that an operator may selectively access different portions of the storage assembly 500 and thereby access specific equipment stored thereon.

Referring still to FIGS. 14-15, the upper member 510 includes a plurality of supports, shown as upper supports 511. As shown in FIGS. 14-15, the upper member includes four upper supports 511. In other embodiments, the upper member 510 includes a different number of upper supports 511 (e.g., one, two, three, six, etc.). As shown in FIG. 14, the upper supports 511 define a plurality of apertures, shown as apertures 512, along vertical edges thereof. The apertures 512 of upper supports 511 receive brackets, shown as brackets 516. As shown in FIGS. 14-15, the brackets 516 facilitate storing snatch blocks 580 within the storage assembly 500. As shown in FIG. 14, the location of the brackets 516 are adjustable to facilitate storing different sized (e.g., larger, small, etc.) snatch blocks 580 within the storage assembly 500. As shown in FIGS. 14-15, the lower member 520 includes a corresponding number of supports (e.g., four, etc.), shown as lower supports 522. The lower supports 522 provide support for the bottom portion of the snatch blocks 580 stored in the storage assembly 500.

As shown in FIG. 14, the storage assembly 500 includes the locking member 170. The locking member 170 of the storage assembly 500 is similar (e.g., operates similarly, etc.) to the locking member 170 of storage assembly 100 discussed above. In the locked position (e.g., the first state, etc.), the locking member 170 engages the slot 114a of the locking plate 114. The locking plate 114 is coupled to the upper member 510 such that when the locking member 170 engages with the slot 114a, both the locking plate 114 and the upper member 510 are rotatably fixed. By way of example, an operator may rotate at least one of the upper member 510 and the lower member 520 after disengaging (e.g., lifting, removing, etc.) the locking member 170 from the slot 114a (e.g., to access a different section or location of the storage assembly 500, etc.). After an operator rotates the storage assembly 100 to a desired position or access point, the operator may move (e.g., translate, rotate, slidably dispose, etc.) the locking member 170 into a corresponding slot 114a of the locking plate 114 to lock or otherwise secure the storage assembly 500 in position (i.e., returning the storage assembly 500 to the first state). In this manner, the storage assembly 500 provides for improved accessibility and organization of equipment (e.g., snatch blocks 580, etc.). Furthermore, the storage assembly 500 disclosed herein is compact, simple, reliable, and easy to use.

Figure 16:
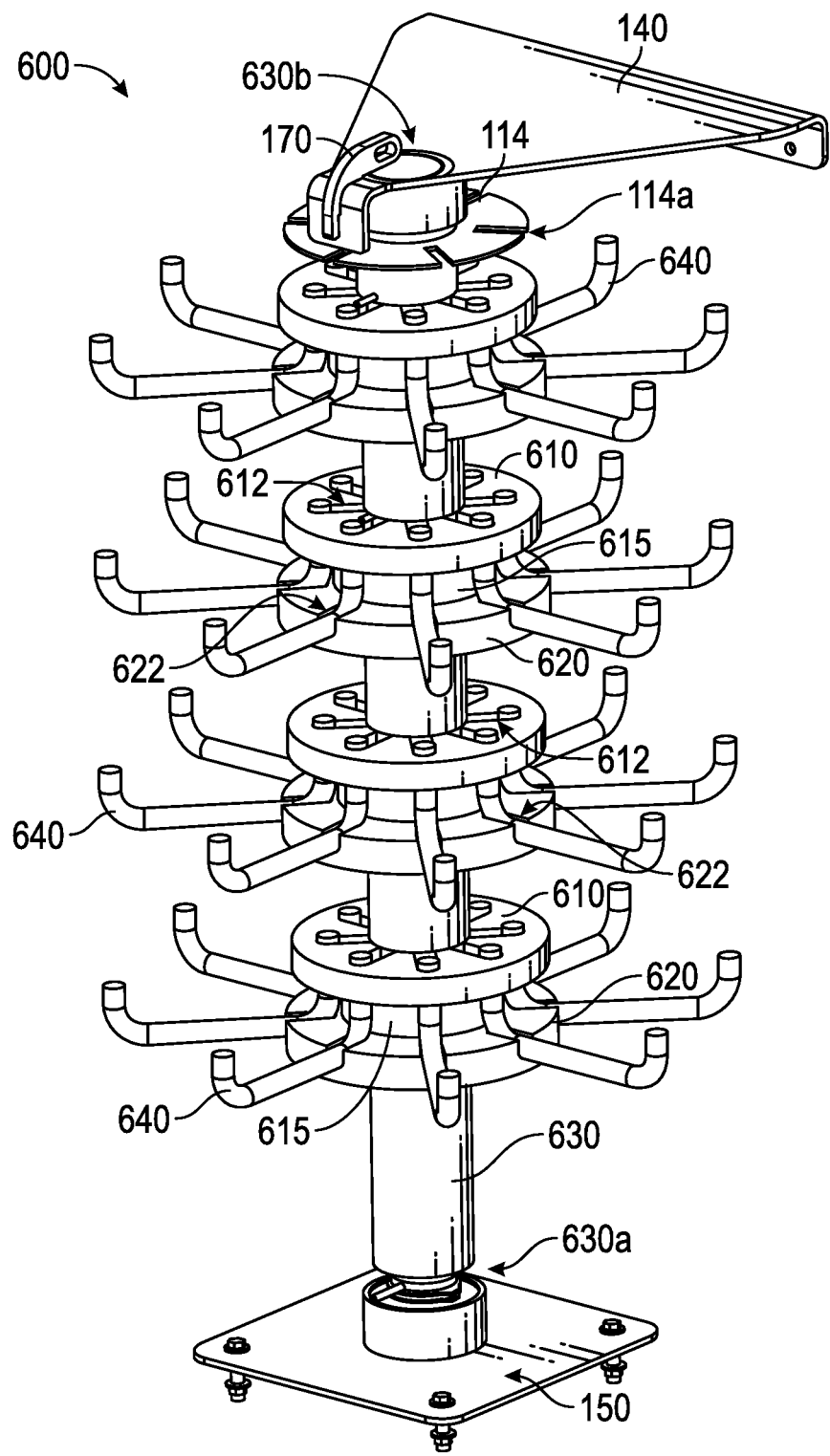
FIG. 16 is a side perspective view of a vehicle storage assembly for equipment storage, according to an exemplary embodiment.

According to the exemplary embodiment shown in FIG. 16, a storage assembly, shown as storage assembly 600, is configured to facilitate storage of still other equipment. The storage assembly 600 may be installed in a vehicle, such as the vehicle 200. As shown in FIG. 16, the storage assembly 600 includes a post, shown as post 630. The post 630 is rotatably coupled to an upper support member 140 at a distal end 630b (e.g., an upper end, etc.) of the post 630 and to a lower support member 150 at a proximal end 630a (e.g., a lower end, etc.) of the post 630. The upper support member 140 and the lower support member 150 may be fixed relative to a portion of the vehicle 200 (e.g., the wall 201, the floor 202, a ceiling of a storage compartment located on or within the body of the vehicle 200, etc.).

As shown in FIG. 16, a plurality of support members are positioned along the post 630. The support members each include an upper member 610, a middle member 615, and a lower member 620. The upper member 610 and the lower member 620 are coupled by way of the middle member 615, thereby forming a single, continuous (e.g., unitary, etc.) structure. In other embodiments, the upper member 610, the middle member 615, and the lower member 620 do not from a single unitary structure. In still other embodiments, the support members do not include middle member 615. As shown in FIG. 16, each of the plurality of upper members 610 define a plurality of slots, shown as slots 612. Each of the plurality of lower member 620 define a corresponding number of slots 622. Each of the slots 612 and the slots 622 align and receive a bracket, shown as bracket 640. By way of example, the brackets 640 may be used to store equipment (e.g., shackles, hooks, etc.).

As shown in FIG. 16, the storage assembly 600 includes the locking member 170 configured to engage with the slots 114a of a locking plate 114. By way of example, when the locking member 170 engages the slot 114a, the post 630 may become rotatably fixed. When the locking member 170 is disengaged, the post 630 is rotatable. According to an exemplary embodiment, each support member is configured to rotate in unison relative to the other support members such that an operator may selectively access different portions of the storage assembly 600 and thereby access specific equipment stored thereon. In other embodiments, the post 630 includes various portions, each independently rotatable such that individual support members are able to be rotated while the other support members remain stationary.

Figure 17:
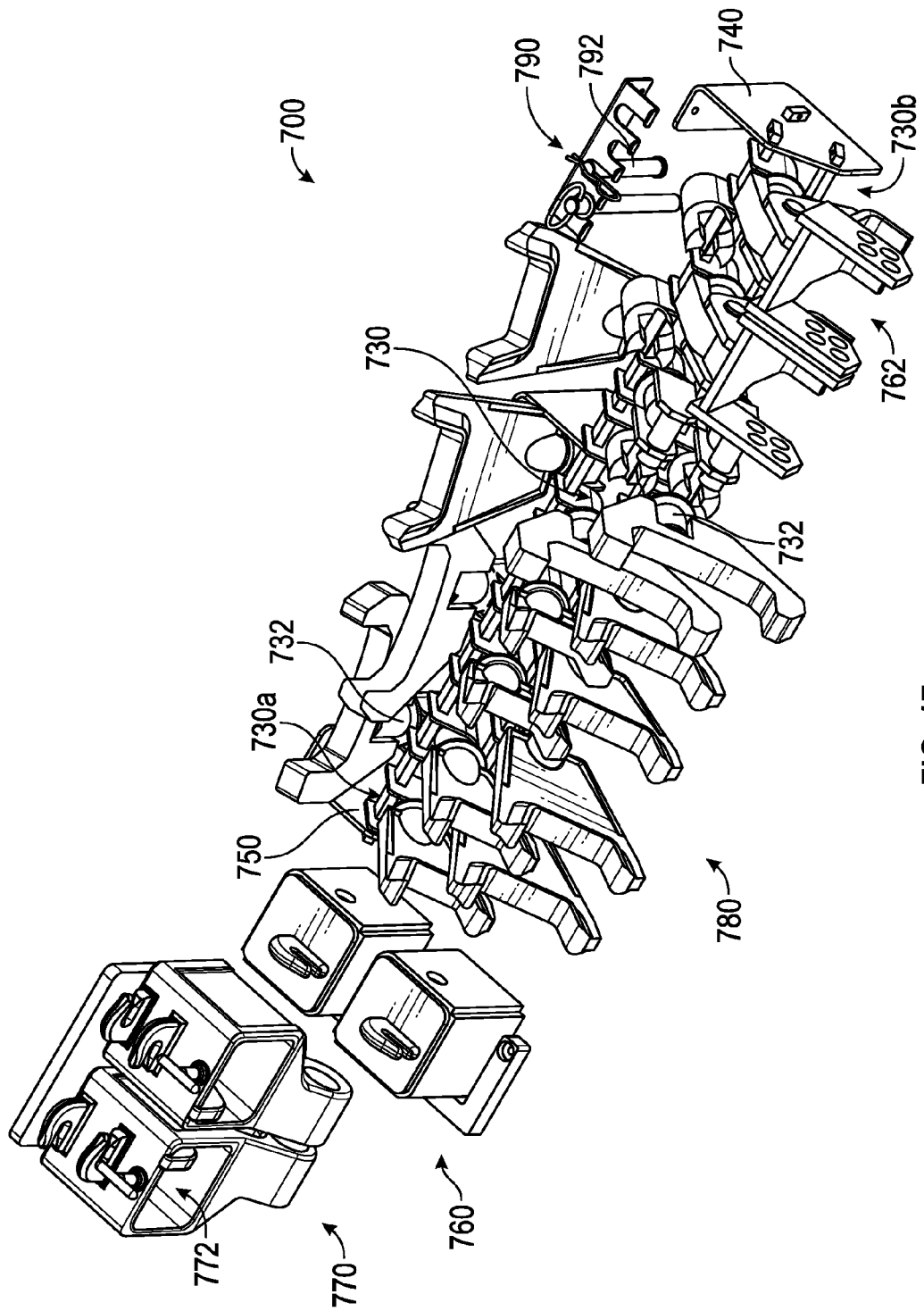
FIG. 17 is a side perspective view of a plurality of frame forks organized within a vehicle storage assembly, according to an exemplary embodiment.

According to the exemplary embodiment of FIG. 17, a storage assembly, shown as storage assembly 700, is configured to facilitate storage of still other equipment. The storage assembly 700 may be installed as part of a vehicle, such as the vehicle 200. In one embodiment, the storage assembly 700 is installed with the longitudinal axis of the storage assembly 700 positioned vertically. In other embodiments, the storage assembly 700 is installed with the longitudinal axis positioned horizontally. As shown in FIG. 17, the storage assembly 700 includes a first support member 740 and a second support member 750. According to various exemplary embodiments, the first support member 740 and the second support member 750 are fixed relative to a portion of the vehicle 200 (e.g., the wall 201, the floor 202, a ceiling of a storage compartment located on or within the body of the vehicle 200, etc.).

As shown in FIG. 17, the first support member 740 and the second support member 750 are connected by a middle support member, shown as storage tree 730. The storage tree 730 is coupled to the first support member 740 (e.g., an upper mounting plate, panel, etc.) at a distal end 730b (e.g., an upper end, etc.) of the storage tree 730 and to the second support member 750 (e.g., a lower mounting plate, panel, etc.) at a proximal end 730a (e.g., a lower end, etc.) of the storage tree 730. According to an exemplary embodiment, the storage tree 730 is rotationally fixed. In other embodiments, the storage tree 730 is rotatably coupled to the first support member 740 and the second support member 750. As shown in FIG. 17, the storage tree 730 includes a plurality of couplings, shown as couplings 732, configured to receive a plurality of frame forks 780. As shown in FIG. 17, the storage tree 730 includes brackets, shown as brackets 762, configured to receive end caps 760. By way of example, the end caps 760 may be secured to the brackets 762 using pins 792. In one embodiment, the pins 792 are coupled to the vehicle 200 (e.g., a wall, a floor surface, etc.) with a housing, shown as pin housing 790. In other embodiments, the pins 792 are stored within the storage assembly 700.

By way of example, the frame forks 780 may attach to a boom of the vehicle 200 via adapters, shown as fork adapters 770. The fork adapters 770 slidably engage the boom via apertures 772. By way of example, the end caps 760 are configured to secure the ends of the boom of the vehicle 200 when the fork adapters 770 and frame forks 780 are being used by an operator. The end caps 760 substantially prevent the fork adapters 770 from disengaging from the boom. In one embodiment, the fork adapters 770 are stored in the same location within the vehicle 200 (e.g., cabinet, shelf, etc.) as the storage assembly 700. In other embodiments, the fork adapters 770 are stored in a different location. In some embodiments, the fork adapters 770 are stored within the storage assembly 700.

Figure 18:
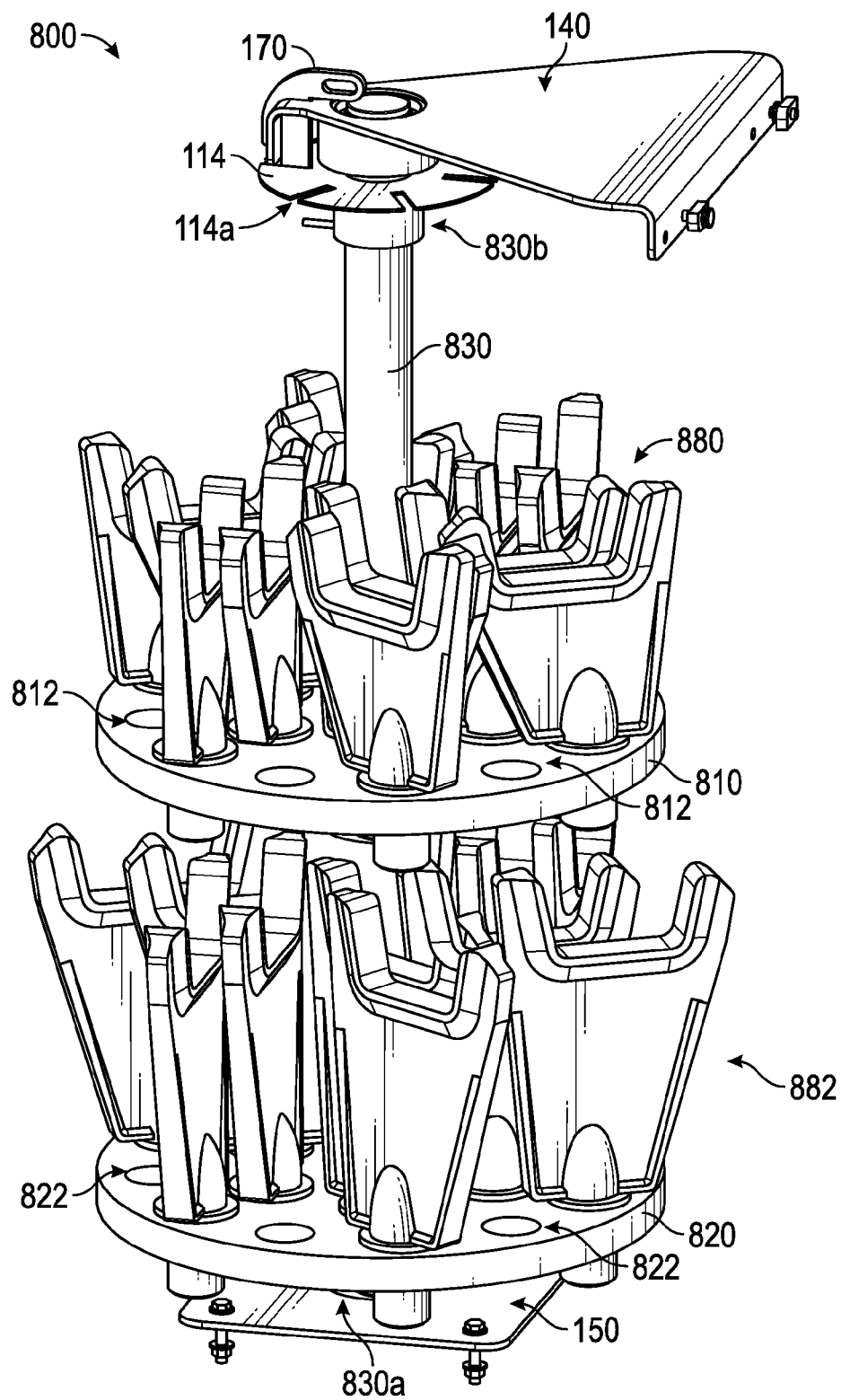
FIG. 18 is a side perspective view of a plurality of frame forks organized within a vehicle storage assembly, according to an alternative embodiment.

According to the exemplary embodiment of FIG. 18, a storage assembly, shown as storage assembly 800, is configured to facilitate storage of various equipment. The storage assembly 800 may be installed as part of a vehicle, such as the vehicle 200. As shown in FIG. 18, the storage assembly 800 includes a post, shown as post 830. The post 830 is rotatably coupled to an upper support member 140 at a distal end 830b (e.g., an upper end, etc.) of the post 830 and to a lower support member 150 at a proximal end 830a (e.g., a lower end, etc.) of the post 830. By way of example, the upper support member 140 and the lower support member 150 may be fixed relative to a portion of the vehicle 200 (e.g., the wall 201, the floor 202, a ceiling of a storage compartment located on or within the body of the vehicle 200, etc.).

As shown in FIG. 18, the storage assembly 800 includes an upper member 810 and a lower member 820. The upper member 810 and the lower member 820 are configured to rotate in unison relative to the upper support member 140 and the lower support member 150 such that an operator may selectively access different portions of the storage assembly 800 and thereby access specific equipment stored thereon. In other embodiments, the upper member 810 and the lower member 820 rotate independent of each other (e.g., upper member 810 may rotate while the lower member 820 remains stationary or vice versa, etc.).

As shown in FIG. 18, the upper member 810 defines a plurality of apertures 812 positioned to receive a plurality of frame forks 880. The lower member 820 defines a plurality of apertures 822 positioned to receive a plurality of frame forks 882. The frame forks 880 and the frame forks 882 a substantially similar in shape and function, though frame forks 882 are longer in a longitudinal direction. As shown in FIG. 18, the upper member 810 is spaced a distance from the lower member 820 (e.g., to provide sufficient storage room for the frame forks 882, etc.). The separation or arrangement of the differently sized frame forks (e.g., the frame forks 880, the frame forks 882, etc.) allows for better organization and ease of use. In other embodiments, the storage assembly includes more storage members (e.g., three, four, etc.) to store a greater variety of frame forks (e.g., different sizes, different material compositions, etc.) or still other components or equipment Each of the various elements disclosed herein, such as the upper support member 140, the lower support member 150, the upper member 110, the lower member 120, the locking plate 114, the post 130, and the locking member 170 can each be made out of various rigid materials or combinations of materials such as steel, polypropylene, aluminum, or any other rigid material suitable for storing (e.g., hanging, etc.) equipment (e.g., chains, hooks, tools, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element (e.g., upper member 110, lower member 120, post 130, upper support member 140, lower support member 150, locking member 170, etc.) disclosed in one embodiment may be incorporated or utilized with any other embodiment disclosed herein.

What is claimed is:

1. A vehicle storage assembly, comprising:
  a bracket including a side wall that defines a cutout;
  a mounting plate;
  a shaft rotatably coupled to the bracket and the mounting plate;
  a hoop coupled to a distal end of the shaft and having a plurality of stations configured to support a rigging accessory;
  a bin coupled to a proximal end of the shaft and having a plurality of cavities configured to receive the rigging accessory;
  a locking member positioned to selectively fix the orientation of the shaft, the hoop, and the bin thereby facilitating operator access to a desired one of the plurality of stations; and
  a locking plate coupled to the hoop and defining a plurality of slots, wherein the locking member is configured to engage with one of the plurality of slots to selectively fix the hoop in one of a plurality of locking positions, wherein the plurality of slots defined by the locking plate are positioned to align with the cutout of the bracket when the hoop and the bin are rotated into one of the plurality of locking positions.

2. The vehicle storage assembly of claim 1, wherein the locking member comprises:
  a first leg extending through one of the plurality of slots defined by the locking plate when the locking member is arranged in an engaged position; and
  a second leg spaced from the first leg and contacting an outer surface of the side wall of the bracket when the locking member is arranged in a disengaged position, wherein the first leg and the second leg define a channel shaped to receive the side wall of the bracket and thereby guide the locking member through the cutout defined by the bracket and into a corresponding one of the plurality of slots defined by the locking plate.

3. The vehicle storage assembly of claim 2, wherein the shaft, the hoop, and the bin are rotationally fixed relative to the bracket and the mounting plate when the locking member is arranged in the engaged position.

4. The vehicle storage assembly of claim 2, wherein the shaft, the hoop, and the bin are rotatable relative to the bracket and the mounting plate when the locking member is arranged in the disengaged position.

5. The vehicle storage assembly of claim 4, wherein the locking member further comprises a retaining feature extending outward from a planar surface of the first leg, wherein the retaining feature is positioned to prevent removal of the locking member from the cutout defined by the bracket.

6. The vehicle storage assembly of claim 5, wherein the retaining feature contacts an inner surface of the side wall of the bracket when the locking member is arranged in the disengaged position.

7. The vehicle storage assembly of claim 1, wherein the bracket is rotatably coupled to the distal end of the shaft and the mounting plate is rotatably coupled to the proximal end of the shaft.

8. The vehicle storage assembly of claim 1, further comprising an actuator positioned to rotate the shaft.

9. The vehicle storage assembly of claim 1, wherein at least one of the bracket and the mounting plate include a tapered roller bearing rotatably coupling the shaft to the bracket and the mounting plate.

10. The vehicle storage assembly of claim 1, wherein the bracket and the mounting plate are coupled to at least one of an interior wall, an exterior wall, a ceiling, and a floor of a storage compartment that is configured to be coupled to a vehicle such that the bracket and the mounting plate are fixed relative to the vehicle.

11. The vehicle storage assembly of claim 1, wherein the rigging accessory includes at least one of a chain, a shackle, a hook, a snatch block, and a frame fork.

\* \* \* \* \*